(12) United States Patent
Aritsuka et al.

(10) Patent No.: US 7,755,480 B2
(45) Date of Patent: Jul. 13, 2010

(54) SECURITY SYSTEM

(75) Inventors: Toshiyuki Aritsuka, Kodaira (JP); Shoji Suzuki, Tokyo (JP); Hiroshi Hanyu, Tokyo (JP); Fumio Enmei, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1201 days.

(21) Appl. No.: 11/341,678

(22) Filed: Jan. 30, 2006

(65) Prior Publication Data
US 2006/0212570 A1 Sep. 21, 2006

(30) Foreign Application Priority Data
Mar. 16, 2005 (JP) ............... 2005-074252

(51) Int. Cl.
G08B 1/08 (2006.01)
(52) U.S. Cl. ............. 340/539.22; 340/506; 340/539.17; 340/5.2; 340/286.02
(58) Field of Classification Search ............ 340/539.22, 340/506, 517, 524, 539, 573.1, 5.2, 500, 340/539.17, 286.01, 286.02, 539.1; 705/5
See application file for complete search history.

(56) References Cited

U.S. PATENT DOCUMENTS

| | | | |
|---|---|---|---|
| 6,617,969 B2 * | 9/2003 | Tu et al. ............... | 340/517 |
| 7,173,532 B2 * | 2/2007 | Hanle et al. ............... | 340/573.1 |
| 2002/0091326 A1 | 7/2002 | Hashimoto et al. | |
| 2006/0294388 A1 * | 12/2006 | Abraham et al. ............ | 713/182 |
| 2007/0210923 A1 * | 9/2007 | Butler et al. ............. | 340/572.8 |

FOREIGN PATENT DOCUMENTS

| | | |
|---|---|---|
| JP | 2002-149824 | 11/2000 |
| JP | 2003-288657 | 3/2002 |
| JP | 2004-124686 | 12/2002 |

OTHER PUBLICATIONS

Office Action from the Japanese Patent Office in English dated Apr. 21, 2009.

* cited by examiner

*Primary Examiner*—Davetta W Goins
(74) *Attorney, Agent, or Firm*—Stites & Harbison PLLC; Juan Carlos A. Marquez, Esq.

(57) ABSTRACT

A security system with processing optimized for monitoring the actions of a surveillance subject and detecting abnormal actions. The action record of an individual is monitored using a sensor network security system SNS, and the development of an action event is reported as an action, and the corresponding processing of the security system SCS is determined based on this action.

10 Claims, 21 Drawing Sheets

FIG. 7

| DATA ID | SENSOR TYPE | MEANING | MEASUREMENT | PLACE OF INSTALLATION | OBSERVATION INTERVAL | DATA LINK POINTER |
|---|---|---|---|---|---|---|
| 01 | NAME TAG | LOCATION | NIL | PS-1 | 3s | DDS1/home/** |
| 02 | TEMPERATURE | AMBIENT TEMPERATURE | TEMPERATURE | MEETING ROOM NO. 1 | 60s | DDS2/home/** |
| 03 | HUMIDITY | AMBIENT HUMIDITY | TEMPERATURE | MEETING ROOM NO. 1 | 60s | DDS1/home/** |
| 04 | MOTION DETECTOR | HUMAN PRESENCE | 1/0 | ENTRANCE | EVENT | DDS1/home/** |
|  |  |  |  |  |  |  |

EVENT TABLE (ETB)

| DATA ID (DID) | EVENT CONTENT (EVT) | DATA STORAGE (DHL) |
|---|---|---|
| XXX | DATA VALUE > A1 | DATA HOLDER Yes |
| YYY | DATA HOLDER = p1 | DATA HOLDER No |
|  |  |  |

ACTION ANALYSIS SETTING SEQUENCE

SINGLE ACTION SETTING SEQUENCE

SINGLE ACTION RESPONSE SEQUENCE

FIG. 20

| SECURITY ACTION RANK | EVENT OCCURRENCE SITUATION | COUNTERMEASURES | ACTIONS | | | |
|---|---|---|---|---|---|---|
| | | | DEVICE CONTROL | NOTIFICATION | GUARDS | SENSOR NETWORK |
| 0 (NORMAL) | NONE | REGULAR MONITORING | CAMERA - WIDE MICROPHONE - LOW SENSITIVITY | NONE | NONE | NONE |
| 1 (ABNORMAL LEVEL 1) | UNEXPECTED ACTION OF A PERSON | ENHANCED MONITORING OF UNEXPECTED ACTION OCCURRENCE AREA | CAMERA - LOW SPEED PAN AROUND MICROPHONE - SENSITIVITY +1 | NONE | NONE | RATE OF COMMUNICATION |
| 2 (ABNORMAL LEVEL 2) | DURATION OF UNEXPECTED ACTION EXCEEDS THE SPECIFIED VALUE | ENHANCED MONITORING OF THE ACTOR, CALLING ATTENTION TO THE OBSERVER AND THE ACTOR | CAMERA - MOBILE OBJECT TRACKING MODE MICROPHONE - SENSITIVITY +2 INCREASE ACTIVE SENSORS | NONE | ALERT OBSERVER | COMMUNICATION CYCLE +2 FLASH LED OF SENSOR-NODE WHICH THE ACTOR WEARS |
| 3 (ABNORMAL LEVEL 3) | DETECT AN ACTION OF HIGH POTENTIALITY OF ABNORMALITY | EXECUTE SECURITY PRESERVATION PROCEDURE | LOCK THE DOOR OF THE RESTRICTED AREA | NONE | ASK OBSERVER TO CHECK SECURITY CONDITION | SOUND A BUZZER OF SENSOR-NODE WHICH THE ACTOR WEARS |
| 4 (ABNORMAL LEVEL 4) | DETECT AN ABNORMAL ACTION | LIMIT THE AREA OF MOVEMENT | CLOSE SECURITY SHUTTER OF TARGET AREA, ALERT, TURN ON A WARNING LIGHT | NOTIFY THE CONTRACTOR | DIRECT OBSERVER TO EXECUTE SECURITY ACTION | SENSING CYCLE OF SENSOR-NODES AROUND THE ACTOR +1 |
| 5 (ABNORMAL LEVEL 5) | DETERMINED AS ABNORMAL ACTION (e.g. FLEE) | ALERT, EVACUATE | LOCK DOORS OF WHOLE AREA | CALL POLICE, GIVE OUT DIRECTIVES ON THE EVACUATION | SEND SECURITY STUFF | SOUND BUZZERS OF ALL ACTORS SENSOR-NODES |

IN CASE OF THICK INSTALLATION OF BASE STATIONS

FIG. 22

PERSONAL INFORMATION TABLE

| PERSONAL ID | NAME | BELONGING | TYPE | PURPOSE | DESTINATION | THOSE WHO AGREE | COMPANION GROUP | GIVING NODE ID | STATE OF REGISTRATION |
|---|---|---|---|---|---|---|---|---|---|
| 123 | TARO SUZUKI | AOZORA INDUSTRY | VISITOR | MEETING | MEETING ROOM 2 | DIRECTOR SATO | GROUP A | 5 | REGISTRATION |
| 124 | SACHIKO TANAKA | AOZORA INDUSTRY | VISITOR | MEETING | MEETING ROOM 2 | DIRECTOR SATO | GROUP A | 6 | UN-REGISTRATION |
| 32 | HIROSHI KOJIMA | KAMINARI ELECTRIC INDUSTRIAL CO., Ltd. | WORKER | REPAIR | POWER DISTRIBUTION ROOM | CHIEF CLERK KATO | GROUP B | 2 | REGISTRATION RELEASE |
| | | | | | | | | | |
| | | | | | | | | | |
| | | | | | | | | | |

FIG. 25

| DESTINATION | PURPOSE | ROUTE | PASSAGE GATE | TYPE | EXPECTED TIME REQUIRED |
|---|---|---|---|---|---|
| MEETING ROOM 2 | MEETING | FRONT RECEPTIONIST → 1F LOBBY → CENTRAL ELEVATOR → 2F LOBBY → PASSAGE 2 → MEETING ROOM 2 | 2F PASSAGE ENTRANCE, MEETING ROOM 2 ENTRANCE | CUSTOMER | 5 MINUTES |
| | SECURITY CHECK | | | ASSOCIATED COMPANY EMPLOYEE | 3 MINUTES |
| POWER DISTRIBUTION ROOM | REPAIR | SIDE GATE RECEPTIONIST → 1F LOBBY → EAST SIDE STAIRS → B1F LANDING → B1F → B2F LANDING → B2F → B2F FLOOR → PASSAGE 1 → POWER DISTRIBUTION ROOM | B2F PASSAGE ENTRANCE, POWER DISTRIBUTION ROOM ENTRANCE | WORKER | 60 MINUTES |
| | | | | WORKER | 5 MINUTES |
| | REPAIR ATTENDANCE | 4F OFFICE ROOM → PASSAGE 2 → PASSAGE 1 → 4F LOBBY → FRONT ELEVATOR → B2F FLOOR → PASSAGE 1 → POWER DISTRIBUTION ROOM | 4F OFFICE ROOM ENTRANCE, 4F PASSAGE ENTRANCE, POWER DISTRIBUTION ROOM ENTRANCE | REGULAR STAFF | 4 MINUTES |

# SECURITY SYSTEM

CLAIM OF PRIORITY

The present invention claims priority from Japanese application JP 2005-074252 filed on Mar. 16, 2005, the content of which is hereby incorporated by reference into this application.

CROSS-REFERENCE TO RELATED APPLICATION

This application is related to U.S. application Ser. No. 11/211,697 filed on Aug. 26, 2005, the disclosure of which is hereby incorporated by reference.

FIELD OF THE INVENTION

The present invention relates to system coordinating an application system and sensor network system capable of continuously tracking changes in people or objects, and relates in particular to a security system.

BACKGROUND OF THE INVENTION

Surveillance cameras and methods such as IC cards for identifying and authorizing individuals have been proposed and implemented in the past for the purpose of controlling entry and exit and preventing dangerous situations.

On the other hand, proposals have also been made to apply recent rapidly developing IT technology and wireless communication technology to the security systems field. JP-A No. 149824/2002 discloses a technology in which a terminal containing sensors for collecting information on an individual, and a containing a wireless communication device for collecting that information, is attached to the individual or installed in the residence, and when an abnormality is identified or predicted based on that collected information, than an alarm is sent via the information terminal or over the network.

SUMMARY OF THE INVENTION

Security systems of the related art utilizing devices such as surveillance cameras are capable of observing the actions of an individual at a specified location. However surveillance becomes impossible when the subject is outside that surveillance range. Applying such systems at other than limited locations such as gate and restricted entry areas with validation by an IC card is impossible, and also requires troublesome procedures by the user. A system capable of periodically or continuously monitoring a person's actions without causing stress to that person, and deciding or predicting the occurrence of an abnormality from a history of actions and changes was not achieved.

JP-A No. 149824/2002 found after completion of this invention on the other hand, disclosed technology for collecting information from a terminal including sensors, and identifying and predicting abnormalities. However collecting information that changes occasionally or with time and making judgments is not easy even with the current advances in computer performance. Moreover, this type of system required some means for making expansion easy when adding new items or locations desired for surveillance.

Further, no consideration was given as to how to coordinate the monitoring system and above described security system when constructing a sensor network system for continuously or periodically monitoring people or objects based on information (here, including information with fixed values such as ID) from different types of sensors.

This invention has the object of providing a sensor network/application system linking the sensor network system and the application system, and capable of allowing the already existing application system to easily utilize information provided by the sensor network system and enhancing that additional value.

The security system of this invention, includes a device installed at the site, and a control device for controlling the state of the device, and a management device for instructing the control device to control the device to a state according to a preset security level, and is characterized in that the management device is connectable to a first server via the network, and the first server contains a function for detecting whether the information collected from the multiple nodes installed within the site matches the pre-registered conditions, and the management device instructs the control devices to change the security level to match the conditions, by registering beforehand conditions for a changing the security level in the first server, and by receiving notification that conditions matched from the first server.

A first server contains a sensor network system, and the sensor network system is comprised of a scheme ideal for processing large quantities of data that accumulate hour by hour and moment by moment. The sensor network system in other words, employs an event action scheme, and if conditions (events) are registered beforehand in the sensor network system then if those conditions are fulfilled, that information (action) can be reported by the network system even without constant surveillance activity by the security system itself so that the security system can automatically exercise fine control.

There are no particular restrictions however though just a first server is used here by the security system making up the application system, a sensor network system with good expandability can be achieved by accumulating data in multiple servers linked with the first server.

The node may be a node capable of being attached to a person. By linking the node with the sensor network system the action of the person at a site can be followed rather than just the action at a position at one time point. By setting to allow for a person's behavior that deviates from predicted conditions (For example, a pattern can be set to allow an action {behavior} different from pre-registered predicted actions.) so that fine control can in this way be achieved that would otherwise be impossible without utilizing a sensor network system.

The value that the application system provides can be further enhanced by coordinating the sensor network system and the application system.

BRIEF DESCRIPTION OF THE DRAWINGS

FIG. 7 is drawing showing the sensor information table;

FIG. 20 is an example of the security process rankings;

FIG. 22 is an example of the individual information table;

FIG. 25 is an event list for the action model.

DETAILED DESCRIPTION OF THE PREFERRED EMBODIMENTS

Figure 1:
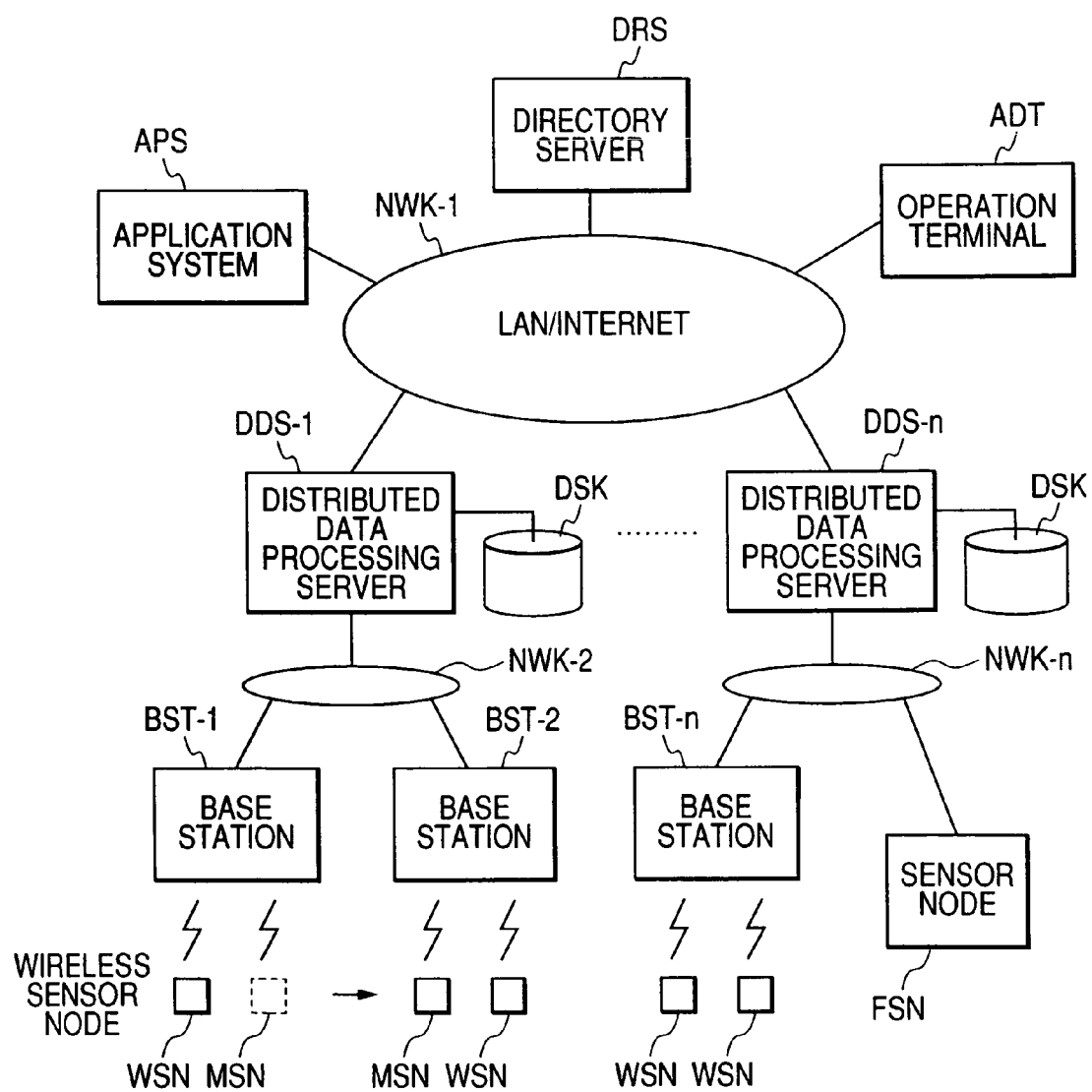
FIG. 1 is a block diagram of the sensor network/application link system.

The embodiments of the present invention are hereafter described while referring to the drawings. FIG. 1 is a block diagram of the sensor network/application link system.

(Overview of the Sensor Network System SNS Structure)

The sensor node WSN (wireless sensor node) and MSN (mobile sensor node) are installed at a specified position or are attached to a specified object or person. These nodes collect information relating to the environment or information relating to the object to which the sensor node is attached, and send that information to the base stations BST-1 through n. These sensor nodes include a wireless mobile sensor node MSN, and a wireless sensor node WSN connected to the base station BST-1 through n, and cable sensor node FSN connected to a network NWK through n by cable.

The wireless sensor node WSN installed at a fixed object for example senses the state around the sensor, and sends that sensing information to a pre-set base station BST. The wireless mobile sensor node MSN sends sensing information to a nearby base station BST and is assumed to be capable of moving such as by attaching to a person or installed in a vehicle, etc.

The terms WSN or MSN is used when indicating the entire wireless sensor node (overall term), and a term such as WSN-1 through n or MSN-1 through n indicates are used to indicate an individual wireless sensor node by attaching a numeral. Other structural elements are shown in the same way, without attaching numerals when indicating a general term, and by attaching numerals "-1 through n" when indicating an individual item.

One or multiple wireless sensor nodes WSN, MSN are connected to each base station BST-1 through n, and each of the base stations BST-1 through n is connected to a distributed data processing servers DDS-1 through n for collecting data from each sensor node by way of the network NWK-2 through n. The networks NWK-2 through n connect the base station BST with the distributed data processing servers (distributed server) DDS. The distributed data processing server DDS is capable of changing the number of connections according to the size of the system scaled.

The distributed data processing servers DDS-1 through n, along with a disk device DSK for storing data detected by the wireless and cable sensor nodes (hereafter sometimes expressed simply as "sensor nodes" when there are no particular restrictions on the means for connecting to the distributed data processing server DDS); perform actions such as executing the specified programs contained in the CPU and memory not shown in the drawing, and collecting measurement data from the sensor nodes as described later on, and storing data, processing data, and moreover performing data transfer or notifying the directory server (management server) DRS or other servers in compliance with conditions specified beforehand. The network NWK-1 is comprised of a LAN or the Internet, etc.

The data collected from the sensor nodes here is mainly a unique ID for identifying a sensor node and numerical data from sensing. This data shows changes along a time base and is not in a format capable of being easily used unchanged by an application system APS. Therefore the directory server DRS converts the output data from the sensor nodes into a real-world model (people, objects, states, etc.) that can be easily used by the application system APS based on definitions that were set beforehand and provides it to the APS.

The distributed data processing servers DDS-1 through n collect data from sensor nodes belonging to the base station BST of networks NWK-2 through n (that DDS-1 through n are connected with), and wireless sensor nodes that have moved from other base station BST. The cable sensor node FSN may also connect to the distributed data processing servers DDS-1 through n. Of course, the cable sensor node FSN may connect to the base station BST, and the base station BST may then control the cable sensor node FSN the same as a wireless sensor node.

The directory server DRS that manages the real-world model related to the sensing information sent from the distributed data processing servers DDS; the directory server DRS and distributed data processing servers DDS and base station BST; and the control terminal ADT for managing and setting the sensor nodes; and the application system APS utilizing this directory server DRS information, are connected to the network NWK-1. A management terminal may be respectively provided for a sensor manager for managing the sensor nodes, and a service manager for managing the services for the sensor network.

The directory server DRS contains a CPU not shown in drawing, a memory and storage device for executing the specified program, and manages objects related to significant information as described later on. In other words, when the application system APS requests access to a real-world model via the application interface, the directory server DRS accesses a distributed data processing servers DDS-1 through n possessing measurement data matching the real-world model, and acquires the corresponding measurement data, and converts the sensing data to a form easily usable by the application system APS if necessary, and conveys it to the APS.

Figure 2:
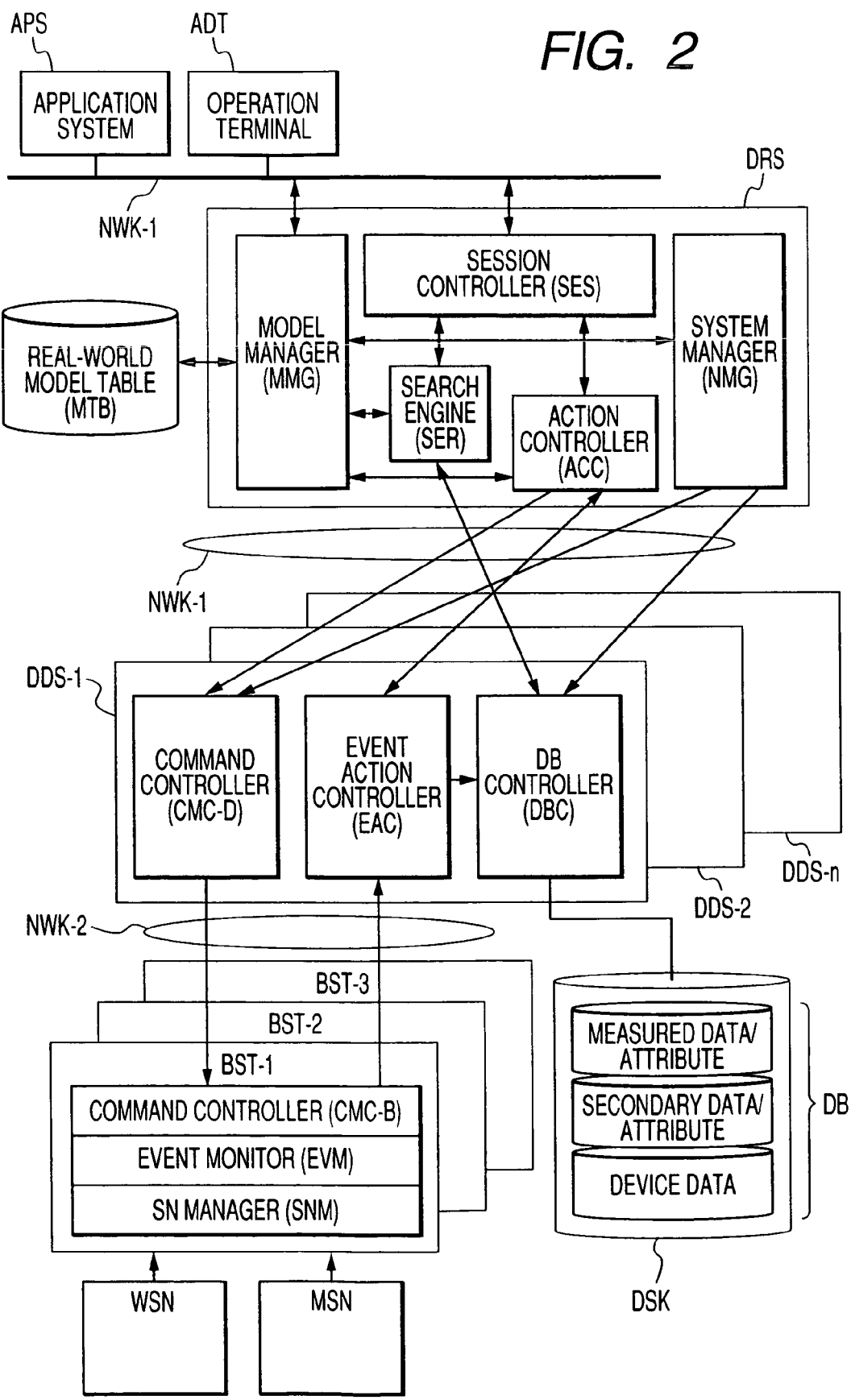
FIG. 2 is a functional block diagram of the sensor network.

FIG. 2 is a functional block diagram of the sensor network/application link system shown in FIG. 1. Here for simplifying the description, only the details at distributed data processing server DDS-1 are shown from among the servers DDS-1 through n shown in FIG. 1, moreover only the base station BST-1 is shown from among the base station BST-1 through n connection to the distributed data processing server DDS-1. The other distributed data processing servers DDS and base stations BST are configured in the same way. The structure of each section is described next.

(Base Station BST)

The base station BST-1 for collecting data from the sensor nodes, carries out communication with the distributed data processing server DDS-1, and sends and receives commands from (and to) the distributed data processing server DDS-1. The base station BST-1 also possesses a controller including; a command controller CMC-B for sending and receiving commands to the sensor nodes, a sensor node manager SNM for managing the sensor node states, and an event manager EVM for detecting trouble in the sensor node and detecting abnormal data from the sensor node and informing the sensor node manager SNM of those detection results. The sensor nodes send the measurement data attached with a preset ID.

The command controller CMC-B exchanges (sends and receives commands) with the command controller CMC-D of the distributed data processing server DDS-1 described later. In response to commands from the distributed data processing server DDS-1, the CMC-B for example executes parameter settings for the base station BST-1, executes parameter setting for the base station BST-1 status, and sends the sensor node status to the distributed data processing server DDS-1.

The sensor node manager SNM retains management information (operating status, remaining power, etc.) on sensor nodes under its control. The SNM then reports that management information instead of the sensor nodes, when the distributed data processing server DDS-1 makes an inquiry to a sensor node. In other words, the distributed data processing server DDS-1 possessing multiple sensor nodes, alleviates its own load by entrusting sensor node management to the base station BST.

The sensor node manager SNM also renews the sensor node management information when the event manager EVM detects an error and reports the sensor node where the error occurred, to the distributed data processing server DDS. A sensor node error indicates a state where sensor node functions have stopped or on the point of stopping, when there is no response from the sensor nose, or when the sensor node power is below the pre-established threshold, or the sensing value has deviated from the range of pre-established normal values.

When the sensor node manager SNM receives a command (setting the output timing) for a sensor node from the command controller CMC-D, it sends this command to the sensor node and makes the setting, and renews the node management information after notification that the setting is complete is received from the sensor node. The sensor node output timing is for example, the period in which the wireless sensor node WSN periodically sends data to the base station BST-1.

The base station BST manages the wireless sensor nodes WSN, MSN and cable sensor node FSN set beforehand under it, and sends the data measured by each sensor node to the distributed data processing server DDS.

(Distributed Data Processing Server DDS)

The distributed data processing server DDS-1 includes a disk device DSK for storing the database DB, and a command controller CMC-D described later, and event action controller EAC, and a database controller DBC.

The command controller CMC-D performs communication with the base station BST as well as the directory server DRS described later, and sends and receives commands, etc.

The event action controller EAC acquires the sensor node contained in the measurement data, each time measurement data from a sensor node is received from the base station BST, loads the rules for event occurrence corresponding to the sensor node ID from the table described later on (event table ETB of FIG. 9), and decides from the measurement data values whether an event has occurred or not. The event action controller EAC also implements actions for an event occurrence matching the ID of the sensor node.

The action contents include processing such as converting the measurement data to processing data, storing the measurement data and processing data via the database control section DBC into the database DB, or notifying the directory server DRS, based on rules established by the application developer.

In this embodiment, information from many sensor nodes can be dispersed and processed by installing multiple distributed data processing servers DDS concentrated by area (or location) for a number of multiple base stations BST as shown in FIG. 1. Distributed data processing servers DDS may for example be installed on each floor of an office, or distributed data processing server DDS may be installed in each building structure in a factory, etc.

The disk device DSK of the distributed data processing server DDS-1 functions as a database DB to store sensor node WSN, MSN, FSN measurement data received from the base station BST, and processing data formed from this measurement data, and device data relating to the base station BST or wireless sensor nodes WSN, MSN and cable sensor nodes FSN.

The database control section DBC for the distributed data processing server DDS-1 stores in a database DB, the measurement data serving as the sensor node output sent from the event action control section EAC. If needed, the DBC numerically processes the measurement data, and stores the processed data obtained by combining it with other data, into a database DB. The device data is rewritten at any time according to requests from the operation terminal ADT.

(Directory Server DRS)

The directory server DRS for managing the multiple distributed data processing servers DDS, includes a session controller SES for controlling communications from the operation terminal ADT and the application system APS connected via the network NWK-1, and also includes a model manager MMG, a (real-world) model table MTB, a system manager NMG, an action controller ACC and a search engine SER.

The model manager MMG performs management tasks using a real-world model (object) easily usable by application systems and measurement data the distributed data processing server DDS collected from the sensor nodes, or by using a real-world model list MDL set with real-world models related to the processing data.

The directory server DRS also manages measurement data equivalent to the real-world model and position information (links such as URL) for positions where processing data is present. In other words, by specifying a real-world model, an application system developer can directly access measurement information from sensor nodes that changes hour by hour and minute by minute. Though the measurement data and the processing data from the sensor nodes increase greatly with the passage of time, the real-world model information size does not change with the passage of time, rather only its content changes. This real-world model is described in detail later on.

The real-world model table MTB is stored in a storage device (not shown in drawing) specified for the directory server DRS.

The action controller ACC for the directory server DRS carries out communications with the event action controller EAC and the command controller CMC-D of the distributed data processing server DDS; and accepts event action setting requests from the application system APS and the operation terminal ADT. The action controller ACC then analyzes the contents of the received events or actions, and according to these analysis results, and assigns function loads between the directory server DRS and the distributed data processing server DDS-1 through n. One action or event may involve multiple distributed data processing servers DDS-1 through n rather than just one distributed data processing servers DDS.

The search engine SER refers to the real-world table MTB information based on a search request for an object received by the session controller SES, and makes a search of the database DB of the distributed data processing server DDS.

If the search request is a query, then a correspondence or link to a database DB is made and conversion to a SQL (Structured Query Language) implemented according to the query contents. The database DB to be searched may sometimes span multiple distributed data processing server DDS. The latest data (stream) to be first acquired can be set by an action setting on the action controller ACC. For example, an action setting such as for constantly transferring the target data to the application system APS, can be set on the event action controller EAC for the matching distributed data processing server DDS.

Next, the system manager NMG provides coordinated management of the distributed data processing servers DDS made up of sensor networks connect to the network NWK-1, and the base stations BST connected to the distributed data processing server DDS, and the sensor nodes connected to the base station BST. In the system manager NMG, an interface is provided to the operation terminal ADT for registering and searching the distributed data processing server DDS, and the base station BST, and the sensor node and the system manager NMG monitors the status of each device and the status of the sensor nodes.

The system manager NMG can issue commands to the distributed data processing server DDS or base station BST, and the sensor nodes and can manage the network resources with these commands. The sensor nodes receive commands from the system manager NMG via the command controller CMC-B of the base station BST (upstream of the sensor nodes), and the base stations BST receive commands from the system manager NMG via the command controller CMC-D of the distributed data processing server DDS.

Commands issued by the system manager NMG via the command controller CMC-D may for example include reset, parameter settings, data deletion, data transfer, and fixed event/action settings, etc.

(Sensor Node Examples)

Figure 3:
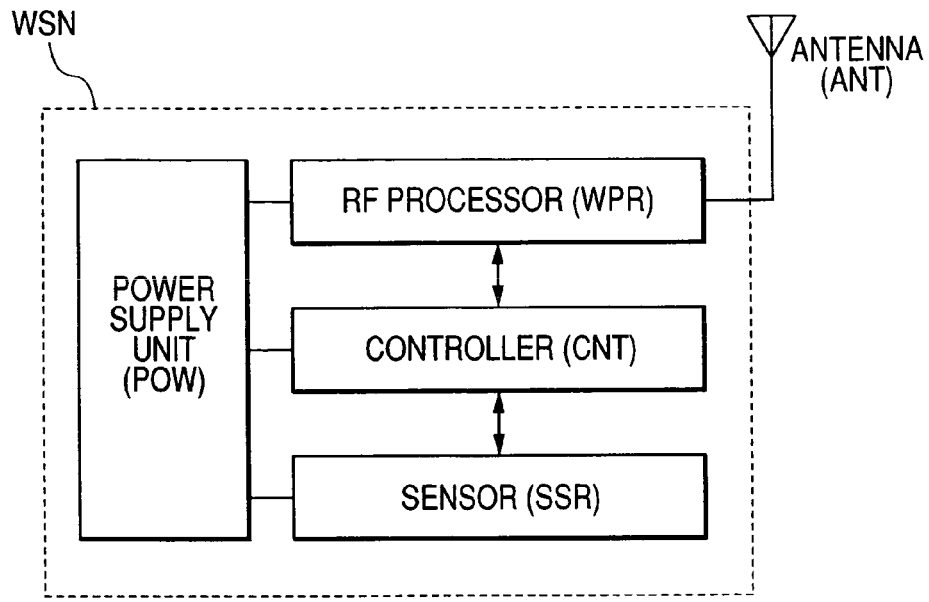
FIG. 3 is a block diagram showing an example of the wireless sensor node WSN.
Figure 4:
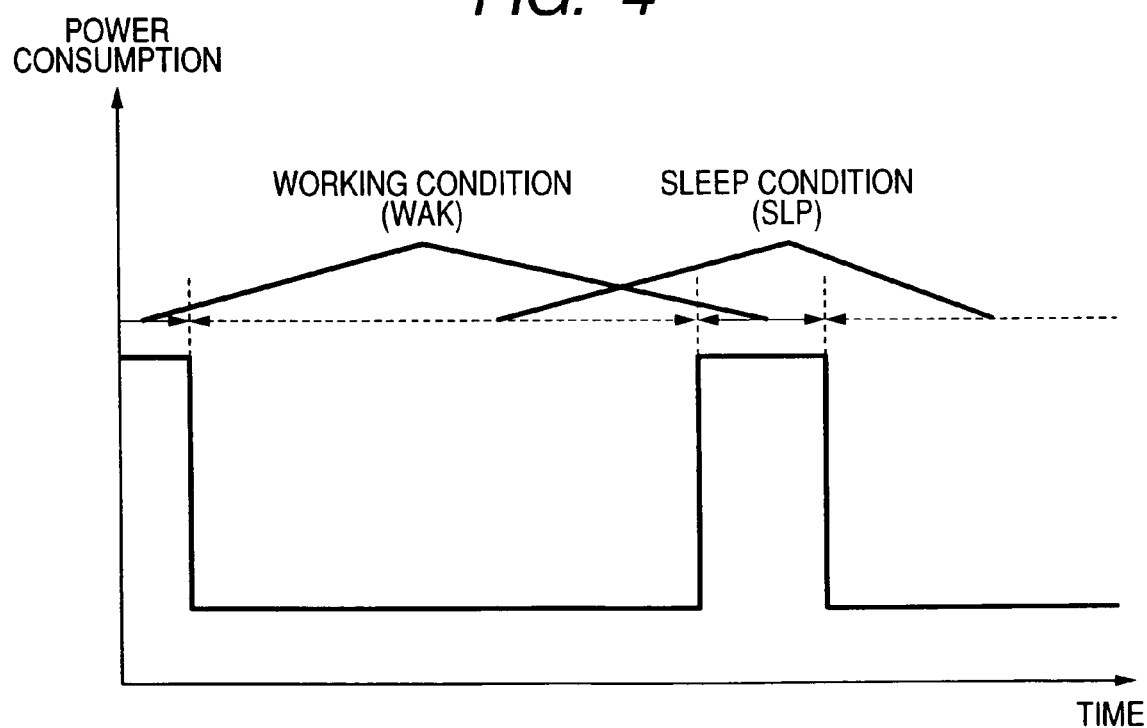
FIG. 4 is a graph showing the operating state of the wireless node, and sowing the relation between the time and the power consumption.
Figure 5:
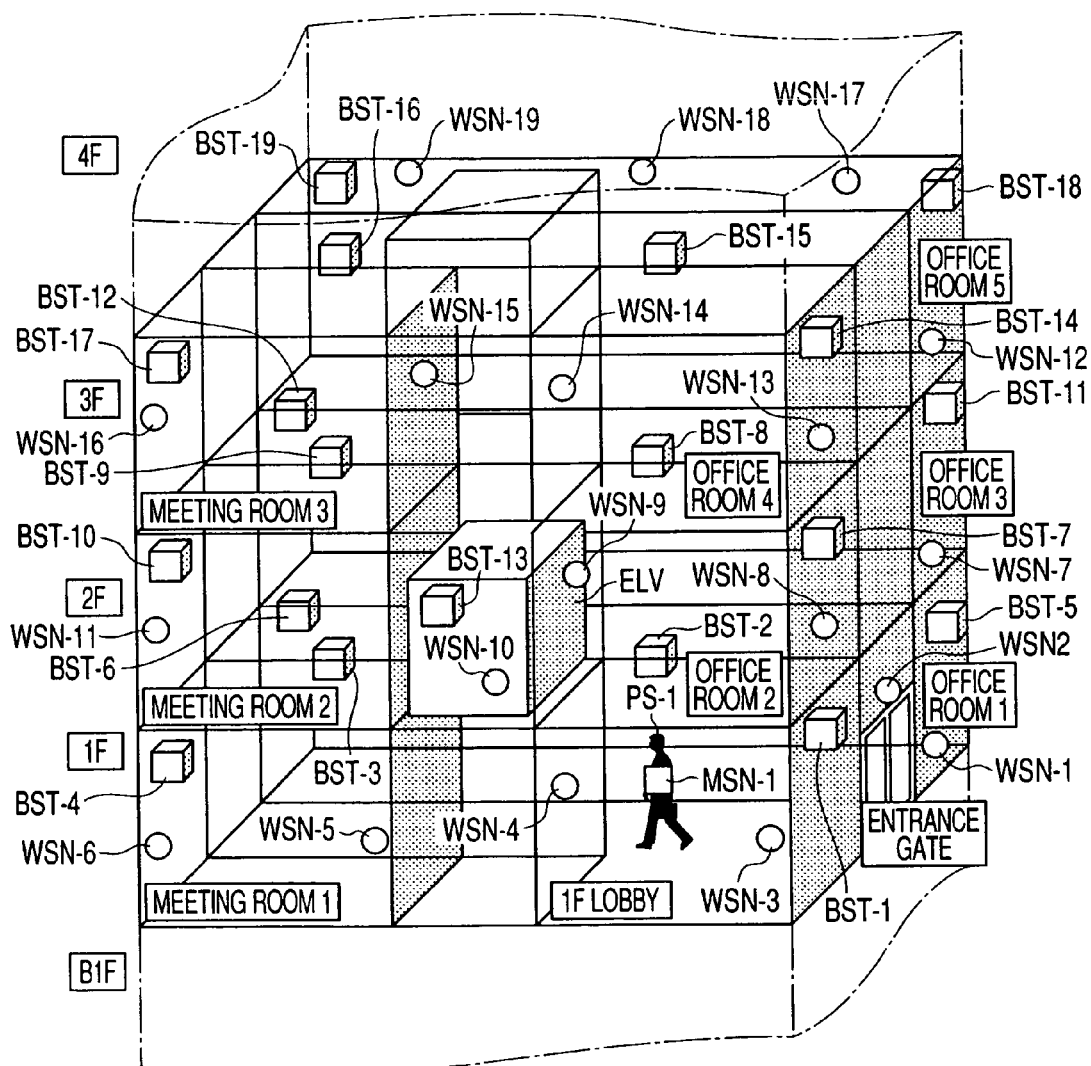
FIG. 5 is a drawing showing an example of the installation such as for the wireless sensor nodes.

Examples of sensor nodes are shown in FIG. 3 through FIG. 5.

FIG. 3 is a block diagram showing an example of the wireless sensor node WSN. The wireless sensor node WSN includes a sensor SSR for measuring a target quantity (temperature, humidity, brightness, position, etc.) or a change in a quantity; a controller CNT for managing the sensor SSR, a wireless processor WPR for communicating with the base station BST, and a power supply POW for supplying electrical power to each block SSR, CNT, WPR, and an antenna ANT for performing transmit and receive.

The controller CNT loads sensor SSR measurement data at preset periods or irregular intervals, attaches a pre-established sensor node ID to this measurement data, and sends it to the wireless processor WPR. Information on the time sensing was performed is sometimes attached to the measurement data as a time stamp. The wireless processor WPR send the data sent from the controller CNT, to the base station BST.

The wireless processor WPR sends commands such as received from the base station BST, to the controller CNT, analyzes the command received from the controller CNT, and performs the specified processing (such as changing settings). The controller CNT also monitor the residual power (or charge quantity) of the power supply POW, and when the remaining power falls below a threshold, the wireless processor WPR informs the base station BST that there is no power.

In order to make measurements over a long period with a limited amount of power, the wireless processor WPR preferably operates at intervals to lower the power consumption. For example in the sleep state SLP as shown in FIG. 4, the controller CNT is configured to stop driving the sensor SSR, and switch from the sleep state to the operating state at a specified timing, and drive the sensor SSR and send the measurement data.

The power supply POW is implemented with a secondary battery. However the power supply POW is not limited to this and may contain a mechanism for generating its own power such as solar cells or vibrator power supplies, or if not a mobile sensor node then electrical power may be supplied from an external power supply.

The example of a sensor node in FIG. 3, contained one sensor SSR, however multiple sensors SSR may be installed. Also, instead of a sensor SSR, a memory may be installed containing a characteristic identifier ID, or a sensor node may be utilized as a tag. The wireless mobile sensor node MSN, and cable sensor node FSN may be configured as shown in FIG. 3 and FIG. 4.

FIG. 5 is a drawing showing an example of sensor node installation connected to the distributed data processing server DDS. In the example in FIG. 5, base stations are installed in elevator, rooms, corridors, and lobby of an office building, and a mobile sensor node was installed on a person in the building. This example was described for use with wireless sensor nodes however, connecting the distributed data processing server and sensor nodes by wireless communication or connecting them by cable can be selected as appropriate.

In the building of FIG. 5, on the first floor for example, a base station BST-1 is installed in the lobby, a base station BST-2 and BST-3 are installed in the first floor corridor, a base station BST-4 is installed in the first meeting room, and a base station BST-5 and BST-6 are installed in the living room 1. On the second floor, a base station BST-7 is installed in the living room 2, a BST-8 and BST-9 are installed in the corridor, a BST-10 in the second meeting room, and a base station BST-11 and BST-12 are installed in the living room 3, also a base station BST-13 is installed in the elevator cage ELV. Moreover, on the third floor, a base station BST-14 is installed in the living room 4, a base station BST-15 and BST-16 are installed in the corridor, a base station BST-17 in the third meeting room, and a base station BST-18 and BST-19 are installed in the living room 5.

On the other hand, a name tag type mobile sensor node MSN-1 for example is attached to the person PS-1 in the building. The WSN-1 through WSN-19 indicate installation-type wireless sensor nodes. These wireless sensor nodes indicate for example are installed in entrances and exits and are people-sensitive so can detect people entering or leaving; or detect absolute quantities or a change in quantities in temperature, humidity, brightness in temperature sensors, humidity sensors, and brightness sensors installed in living rooms and meeting rooms.

The sensor nodes MSN-1, and WSN-1 through WSN-19 carry out wireless communication with any of the base stations BST-1 through BST-19 installed in the building, to send the quantity (state) or change in quantity (state) detected by utilizing the sensor. The base stations BST-1 through BST-19 send the quantity (state) or change in quantity (state) received from the sensor nodes, to the distributed data processing server DDS via the network NWK-2 through NWK-N as shown in FIG. 1.

(Sensor Network Operating Principle)

Figure 6:
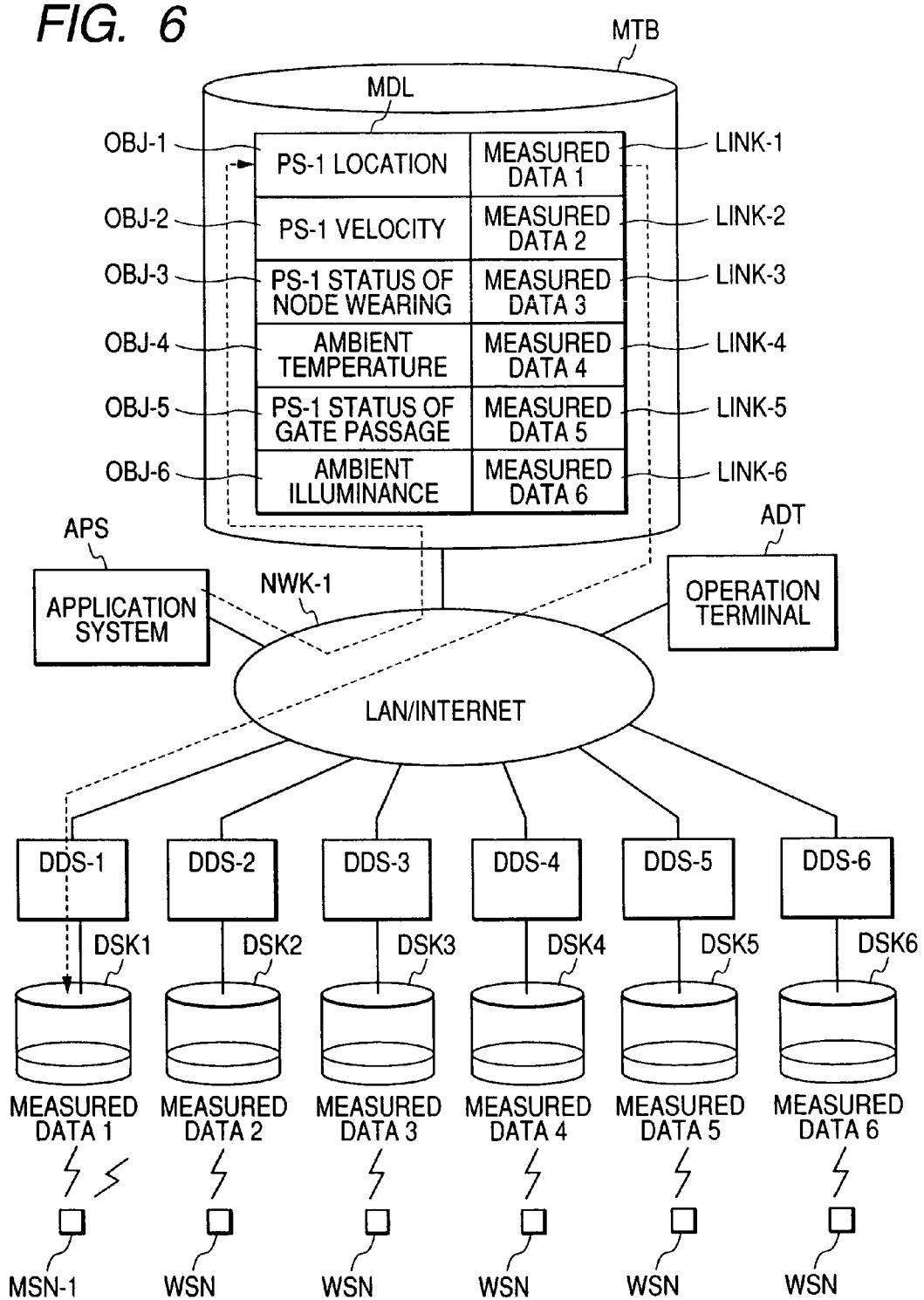
FIG. 6 is a block diagram showing the relation between the object and the sensor node measurement data.

The operating principle of the sensor network SNS is described next while referring to FIG. 6. The block diagram in FIG. 6 shows the relationship of sensor node measurement data with objects in the specific shape of a real-world model.

The directory server DRS described using FIG. 1 and FIG. 2 generates objects (OBJ-1 through OBJ-6) described below as the real-world model shown in FIG. 6, and specified in the real-world model list MDL of the real-world model table MTB. Here, the case of a person PS-1 is shown using the office building of FIG. 5, and the wireless sensor node MSN-1 shown in FIG. 6 is attached to this person.

As one example, the mobile sensor node MSN-1 position information is specified by the system manager NMG for storage in the distributed data processing server DDS indicated by the measurement data 1 (data storage address in FIG. 7). There are no particular restrictions on the method for finding the position information for the mobile sensor node MSN-1 however in the simplest method, the position of the base station BST communicating with the mobile sensor node MSN can be specified as the mobile sensor node MSN-1 position.

In the real-world model list MDL for the real-world model table MTB, in the person PS-1 position called the object (OBJ-1), the data itself is specified by a data link pointer called measurement data 1 (LINK-1), and the linking of the actual data storage position with the real-world model is then managed. In other words, an object (OBJ-1) for the person PS-1 position is linked to the distributed data processing server DDS storage position corresponding to the measurement data 1 (LINK-1). In the example in FIG. 6, position information (what base state BST it is in) of the wireless server node MSN-1 showing the person PS-1 position is stored for example in disk device DSK1 of the distributed data processing server DDS-1.

The PS-1 position (OBJ-1) value can be accessed from the application APS as if present in the real-world table MTB of the directory server DRS. However, the actual data is stored in advance in the disk device DSK1 of the distributed data processing server DDS-1 and not in the directory server DRS.

An object called the PS-1 movement speed (OBJ-2) is specified in the real-world model table MTB so that the movement speed information of the sensor node MSN-1 that is moving, will be stored in the measurement data 2 (LINK-2). There are no particular restrictions on the method for finding the movement speed of the mobile sensor node MSN-1. However, the simplest method is to find it from the switching time of the base station BST communicating with mobile sensor node MSN-1. Moreover, a storage position and a corresponding distributed data processing server DDS are specified for the measurement data 2. For example, data is stored in the disk device DSK-2 of the distributed data processing server DDS-2.

An object called the PS-1 node attachment (OBJ-3) is specified in the real-world table MTB so that the node attachment status determined by detecting attachment or removal such as by a switch attached by a clip on the name tap wireless sensor node MSN-1, is stored in measurement data 3 (LINK-3). Moreover, a storage position and a corresponding distributed data processing server DDS are specified for the measurement data 3. For example, the state of the switch installed on MSN-1 is stored in the disk device DSK-3 of the distributed data processing server DDS-3.

An object called the ambient temperature (OBJ-4) is specified in the real-world model table MTB so that the temperature information measured by the temperature sensor of the wireless sensor node (for example WSN-3 in FIG. 5) connected to the base station (for example BST-1) where the person PS-1 is connected, is stored in the measurement data 4 (LINK-4). Moreover, a storage position and a corresponding distributed data processing server DDS are specified for the measurement data 4. For example, the temperature from the wireless sensor node WSN-3 is stored in disk device DSK4 of the distributed data processing server DDS-4.

An object called the PS-1 gate pass (OBJ-5) is specified in the real-world model table MTB so that the person detection information measured by the person sensor of the wireless sensor node (for example WSN-2) connected to the base station (for example BST-1) to which the person PS-1 is connected, is stored in the measurement data 5 (LINK-5). Moreover, a storage position and a corresponding distributed data processing server DDS are specified for the measurement data 5. For example, the person detection information from the wireless sensor node WSN-2 is stored in disk device DSK5 of the distributed data processing server DDS-5.

An object called the ambient brightness (OBJ-5) is specified in the real-world model table MTB so that the brightness information measured by the brightness sensor of the wireless sensor node (for example WSN-3 in FIG. 5) connected to the base station (for example BST-1) where the person PS-1 is connected, is stored in the measurement data 6 (LINK-6). Moreover, a storage position and a corresponding distributed data processing server DDS are specified for the measurement data 6. For example, the brightness from the wireless sensor node WSN-3 is stored in disk device DSK6 of the distributed data processing server DDS-6.

Each object OBJ specified in the real-world model table MTB is stored via a data link pointer (LINK) that corresponds to the measurement data. The target data can be viewed from the application APS as if in the directory server DRS, however the actual data is stored in the distributed data processing server DDS.

Measurement data measured by the sensor nodes or processed data made by converting measurement data into a form easy for the application system to use, and storage positions for data usable by the application system are all set in the data link pointer LINK. The measurement data from the sensor nodes is collected and accumulated by each distributed data processing server DDS. Moreover, if an event action has been set as described later on, then the measurement data can be processed, and stored as processed data in the specified distributed data processing server DDS.

The distributed data processing server DDS collects data from the actual sensor node, accumulates data, and processes the data. The directory server DRS manages the real-world model, and storage link pointer for the information and also specifies the sensor node, etc.

The application system developer can search for an object OBJ without having to be aware of the sensor node, and can be acquired the desired data corresponding to the value measured by the sensor node (or processed data).

The directory server DRS manages the storage link pointer (link destinations) of each object OBJ, and the distributed data processing server DDS stores and processes the actual data so that the load on the distributed data processing server DDS is prevented from becoming excessive even if there are a huge number of sensor nodes. In other words, the traffic on the network NWK-1 connecting the directory server DRS and distributed data processing server DDS and the application system APS is limited so as not to become excessive.

In a state where a specified time has elapsed after starting measurement, the actual measurement data from the sensor nodes is written in the disk device DSK of the distributed data processing server and the quantity of data becomes huge as time passes. However, in the data link pointer LINK-1 through 6 corresponding to objects OBJ-1 through 6 set in the model list MDL of the real-world model table MTB of the directory server DRS, the quantity of information does not change even with the passage of time, and only the information content specified by the storage data link pointer LINK-1 through 6 changes.

The example in FIG. 6 showed objects being stored in different data processing servers. Needless to say however, different objects can be stored in disk devices of the same data processing server. Which data processing server to store measurement data for what object should be determined in to make handling the data processing task easier.

(Relation of Measurement Data to Events)

Figure 8:
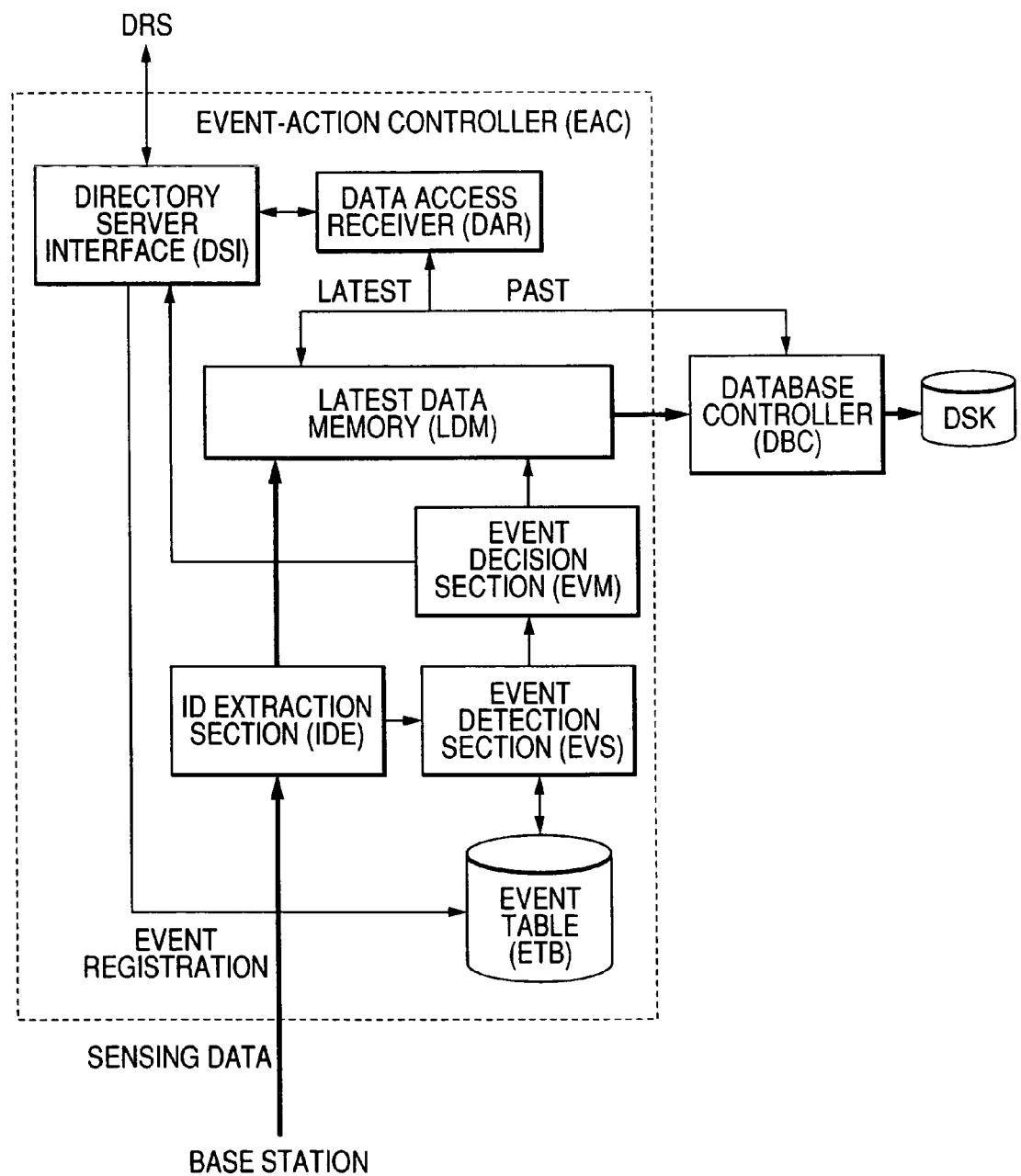
FIG. 8 is a block diagram showing the event action controller of the distributed data processing servers DDS.
Figures 9, 10:
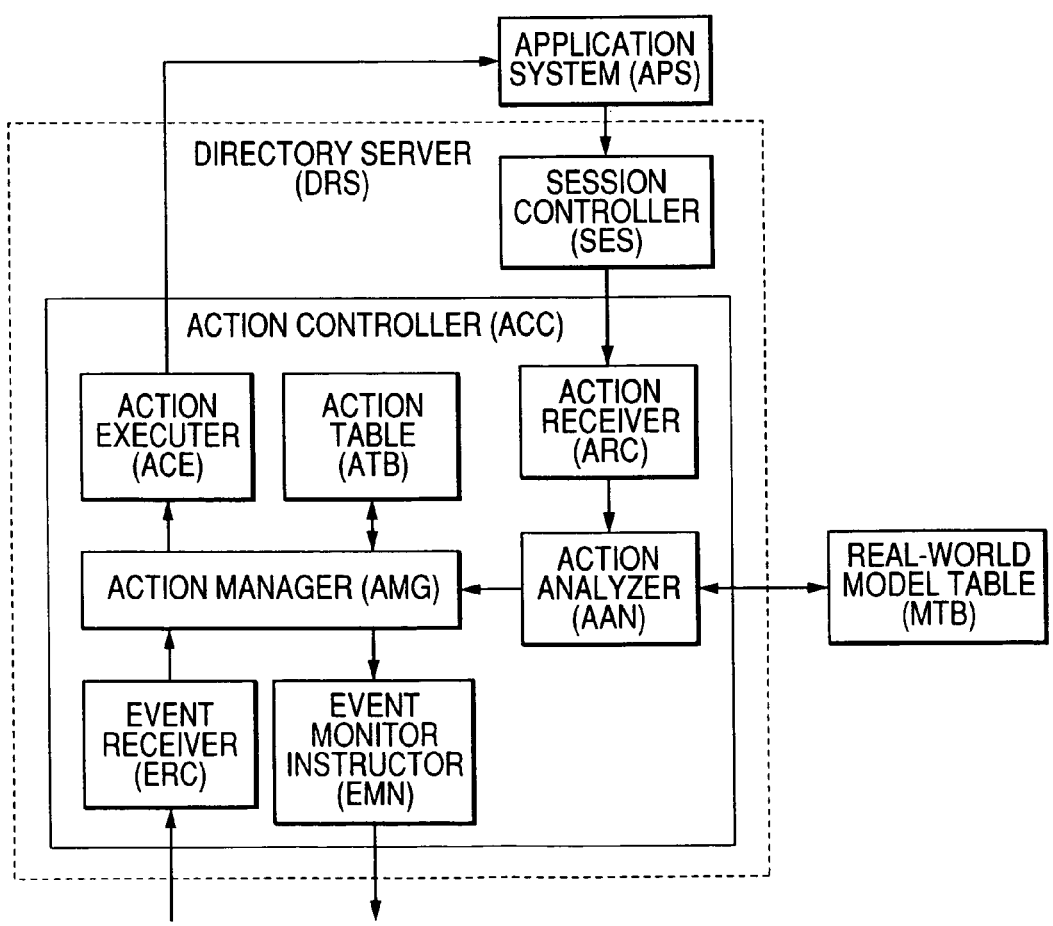
FIG. 9 is a drawing showing the event table.
FIG. 10 is a block diagram of the action controller ACC for the directory server DRS.

The relation of measurement data collected by the distributed data processing server DDS to the event action based on the measurement data is shown next in FIG. 7, FIG. 8, and FIG. 9.

FIG. 7 is an example of the sensor information table STB managed by the directory server DRS. The sensor information table STB is stored in the real-world model table MTB. The sensor type, the meaning of the sensing information, the measured value, the installation location, the sensing interval, and the data link pointer are stored in the sensor information table STB in data ID attached to each measurement data. Here, ID are attached to each measurement data in view of the fact that one sensor node is related to multiple types of sensing data. However when one sensor node is only related to one type of sensing data, then a sensor ID can be utilized instead of a data ID. The sensor information table shown in FIG. 7 is one example of the storing of information and the information that is stored can be increased or decreased according to the need for managing the sensor network system.

In FIG. 8, the event action controller EAC of the distributed data processing server DDS, contains an event table ETB for linking events to measurement data collected via a directory server interface DSI from a base station BST. As shown in FIG. 9, the event table ETB of one record is made up of a data ID (DID) attached to measurement data assigned to each sensor node, and an EVT showing event occurrence conditions relating to the measurement data, and a data storage DHL for deciding whether or not to stored measurement data in a database DB.

For example when the value for measurement data where the data ID "XXX" in the figure is larger than A1, then an event occurrence is reported to the directory server DRS. Measurement data whose data ID is "XXX" is set so that measurement data is written in the disk device DSK when the data arrives.

In the distributed data processing server DDS first of all, measurement data from the base station BST is received in the sensing data ID extraction section IDE, and the data ID attached to the measurement data is extracted. The sensing data ID extraction section IDE sends the measurement data to the latest data memory LDM.

The extracted data ID is sent to the event detection section EVS, a search made of the event table ETB, and if there is a record matching that data ID, then the event content EVT for the applicable record, and the measurement data are sent to the event decision section EVM.

In the event decision section EVM, the measurement data is compared with the event contents EVT, and if conditions are met then an event occurrence is reported via the directory server interface DST to the directory server DRS. Also, the event decision section EVM conveys a data storage DHL request to the latest data memory.

The database controller DBC received data from the latest data memory LDM where data of the data storage DHL of event table ETB is a YES, and writes it in the disk device DSK.

When the directory server interface DSI has received a reference request for measurement data from the directory server DRS, the distributed data processing server DDS sends the applicable access request to a data access receiver (section) DAR.

If the access request is for the latest data, then in the data access receiver, the measurement data for the data ID contained in the access request is loaded from the latest data memory (LDM), and sent back to the directory server interface DSI. If the access request is for past data, then the measurement data for the data ID contained in the access request is loaded from the disk device DSK and sent back to the directory server interface DSI.

In the distributed data processing server DDS, the latest data among the sensor node data collected from the base station BST is held in the latest data memory LDM, and also only data expected to be referred to later on is recording in the disk device DSK. Also, settings can be made to data in the disk device DSK only when an event has occurred. This setting prevents an increased in the amount of disk usage due to periodically (surveillance periods) collecting data. These methods allow one distributed data processing server DDS to monitor multiple base station BST (in other words, multiple sensor nodes).

(Action Controller)

FIG. 10 is a block diagram showing in detail the action controller ACC of the directory server DRS.

The action controller ACC automatically performs preset actions based on events receives from the event action controller EAC of the multiple distributed data processing server DDS.

The action controller ACC therefore includes: an action receiver ARC to receive action settings from the application system APS via the session controller SES; and an action analyzer AAN to analyze the accepted actions, and make settings to apportion the functions (or load) between the directory server DRS and the distributed data processing server DDS according to the analysis results; and an action manager AMG to manage the defining and executing of actions; and an action table ATB for storing the relation (link) between actions and events according to the setting request from the application system APS; and an event monitor instructor EMN to send instructions to the distributed data processing servers DDS-1 through n to monitor events specified by the action table ATB; and an event receiver ERC to receive notification of events that occurred in the distributed data processing servers DDS-1 through n; and an action executor ACE for executing specified events based on received actions and definitions in the action table ATB.

Figure 11:
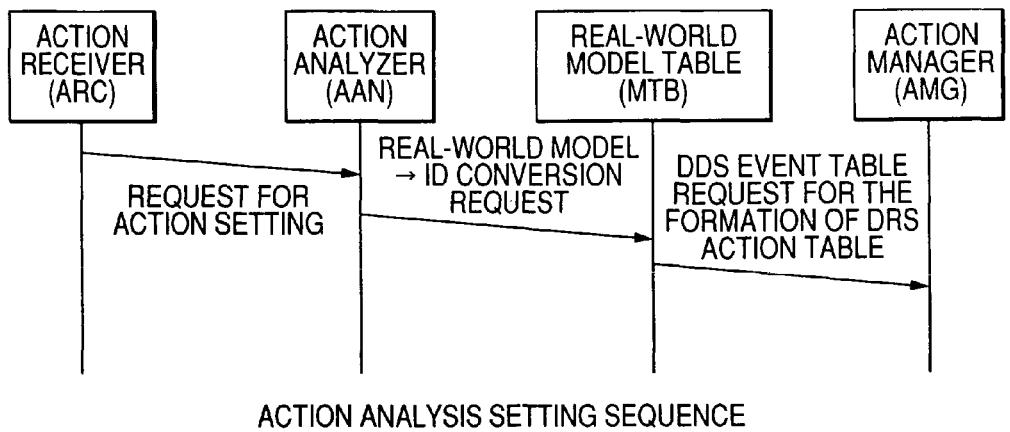
FIG. 11 is a drawing showing the action table.

The registering of an action is described next while referring to the timing chart in FIG. 11. First of all, the applications system administrator in FIG. 11 connects to the action controller ACC of the directory server DRS from the application system APS, and request an action setting. One action for example might be monitoring a Mr. X passing through a gate such as an entry or an exit, and notifying the application system APS, and the setting of this action is described next.

When a request for an action setting is received, the action receiver ARC of the action controller ACC make a request to the action analyzer AAN to set the applicable action. The action analyzer AAN selects a data ID for subject (or object) surveillance, and moreover decides what must happen in the measurement data that will cause an event to occur. In other words, it (AAN) constructs a model allowing a decision to be made from sensing data accumulated in the sensor net system on the real-world subject called, "Mr. X passed through gate".

Here, a real world model as previously shown in FIG. 6 is specified for the case of Mr. X=person PS-1 in the real world model table MTB so that the data ID (called "X2") is acquired from the real world model list MDL and from the information storage destination (distributed data processing servers DDS-1).

In order to make the distributed data processing server DDS generate a "Mr. X passed through gate" event, the action manager AMG sends an instruction to the distributed data processing server DDS managing the selected sensor node to generate a "Mr. X passed through gate" event. The action manager AMG then sets an action called, "Bring Pop Up to Application system" in the action table ATB, and sets a sensor ID as the ID for the event to execute the applicable action.

Figure 12:
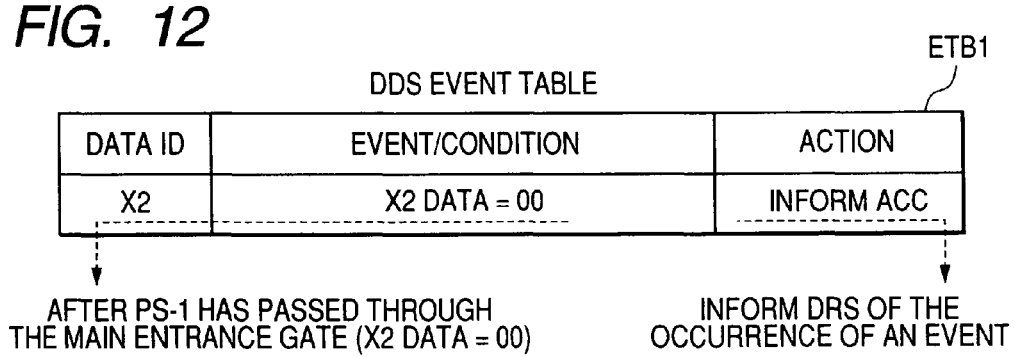
FIG. 12 is a diagram showing entries in the event table of the distributed data processing servers DDS

As shown in FIG. 12, a condition "00" called passing the gate, for the data ID=X2 acquired from the real-world list model MDL, and the action controller ACC of the directory server DRS at the event notification destination for performing the action, are registered in the distributed data processing server DDS that received the instruction from the action manager AMG of the directory server DRS.

A more specific description is related using the example in FIG. 6. The directory server DRS registers an event table ETB as shown in FIG. 12 in the distributed data processing server DDS-1 that manages the object OBJ-1 (position information for the wireless sensor node MSN-1). Here, if the base station is set to include a condition"00" in the communication range for the applicable gate, then a value"00" for the data ID (X2) corresponding to the object OBJ-1 (position information for the wireless sensor node MSN-1) is sent back when the person PS-1 has passed through the applicable gate. The sensing information is in this way linked with the real-world subject (object), and when the condition X2=00 is established, the distributed data processing server DDS-1 notifies the action controller ACC of the directory server that an event has occurred.

Needless to say, the event occurrence conditions described above are only one example. The event occurrence condition may also for example utilize both position information on person PS-1 and information from a motion (person) sensor attached to the gate.

Figure 13:
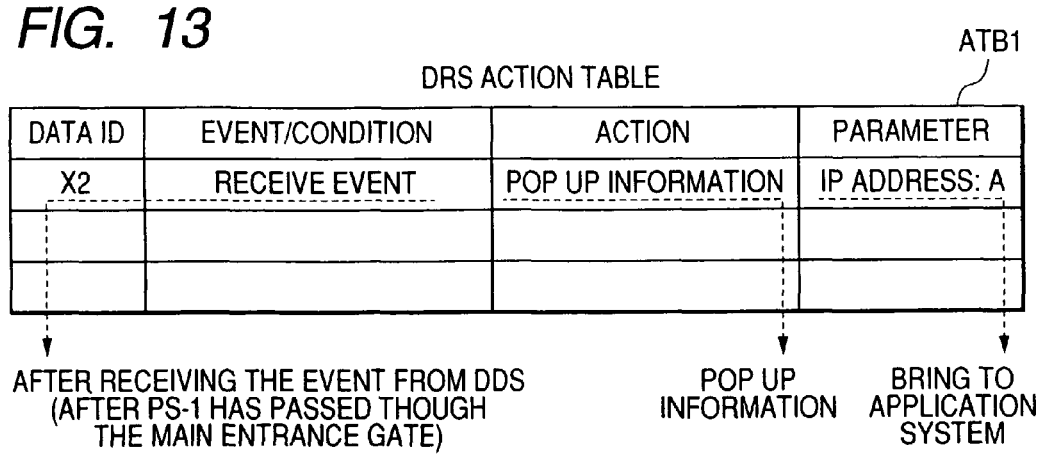
FIG. 13 is a diagram showing entries in the action table of the directory server DRS.

The action table ATB of FIG. 13, is the action table for the directory server DRS. The data IC=X2 showing "PS-1 passed through gate" is set in the Data ID box showing the event ID of the surveillance subject. The receiving of the event occurrence from the distributed data processing server DDS-1 is set in the Event/Condition box. The notification (pop up information) to the application system APS is set in the Action box executed by the directory server PRS. The IP address showing the application system APS is set in the Parameter box (for the action).

As shown in FIG. 13, in order for the action manager AMG to register an action in the action table ATB, an event condition is that the event for data ID=X2 is received; and the action notified to the application system is set for execution per the address recorded in the parameter box.

Figure 14:
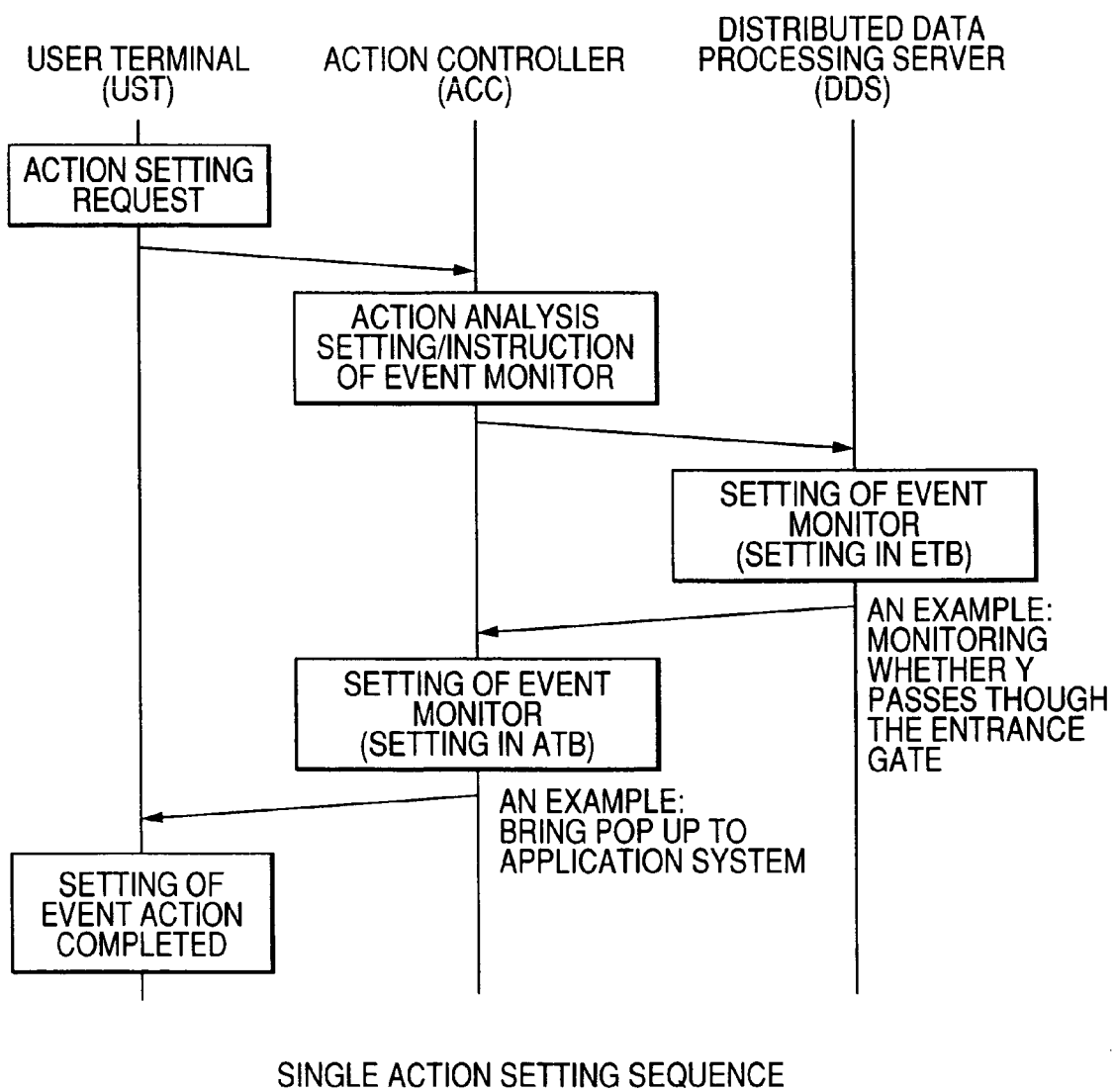
FIG. 14 is a timing chart showing the setting flow for a single action.

As described above, a single action is the implementing of one action from one event occurrence, and the single action setting sequence for such an action is shown in FIG. 14. In other words, an action setting request is made from the application system APS to the action controller ACC of the directory server DRS; the action controller ACC generates an action analysis and instruction of event monitor (namely, an event surveillance instruction); and an event table ETB is specified by the event action controller EAC of the distributed data processing server DDS. The action manager AMG of the action controller ACC then instructs the event receiver ERC to monitor the event (data ID=X2) that was set. The action controller ACC in this way notifies the application system that setting of the action (sequence) is complete.

(Executing the Action)

Figure 15:
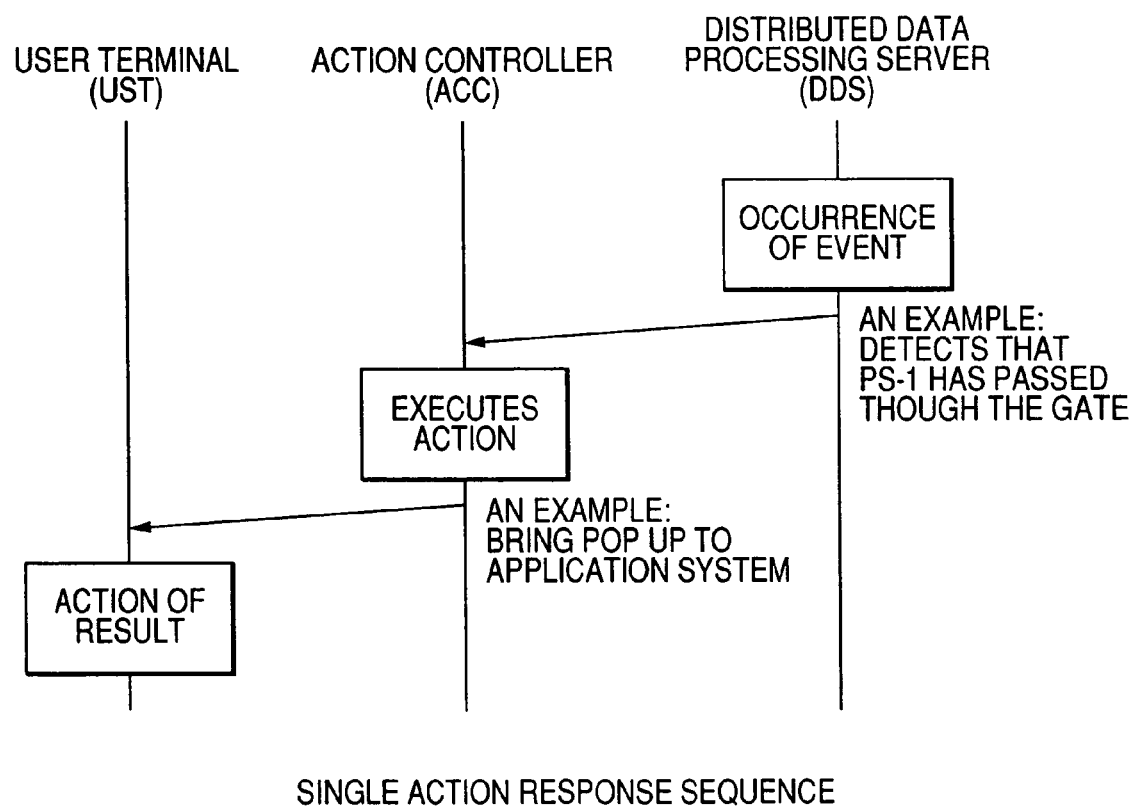
FIG. 15 is a timing chart showing the response flow for a single action.

FIG. 15 is a timing chart showing the execution of the action that was set.

Measurement data for the sensor node monitoring the target subject changes to the event occurrence condition "00", and when decided that Mr. X has passed through the gate, the distributed data processing server DDS-1 generates an event notification (pop up) relating to data ID=X2.

The distributed data processing server DDS notifies the directory server DRS of the event occurrence, and the event receiver ERC of FIG. 10 receives notification. The action manager AMG of the directory server DRS searches the action table ATB of FIG. 13 from the event that was received, and decides if a matching action is present or not. The ID=X2 event that was received, is specified in the action table ATB so the action manager AMG notifies the action executor ACE of the parameter and action for the action table ATB.

The action executor ACE notifies the application system APS that the person PS-1 has passed through the gate.

The above example described executing one action for one event occurrence. However, if event occurrence conditions for two or more events are established (fulfilled) then an action may be set for execution, and multiple actions may be executed for one event occurrence.

As stated above, event action control can be implemented by the directory server, and also by the data processing server, and this is preferably determined by the contents of the event and action. For example if the event decision can be implemented with data stored in one data processing server, then it is preferably executed on the data processing server to lighten the load on the directory server and the load on the communication path. On the other hand, when the data is dispersed among multiple data processing servers, then execution may be performed by the directory server and the event decision assigned to one data processing server.

(Sensor Network/Application Link System)

Figure 16:
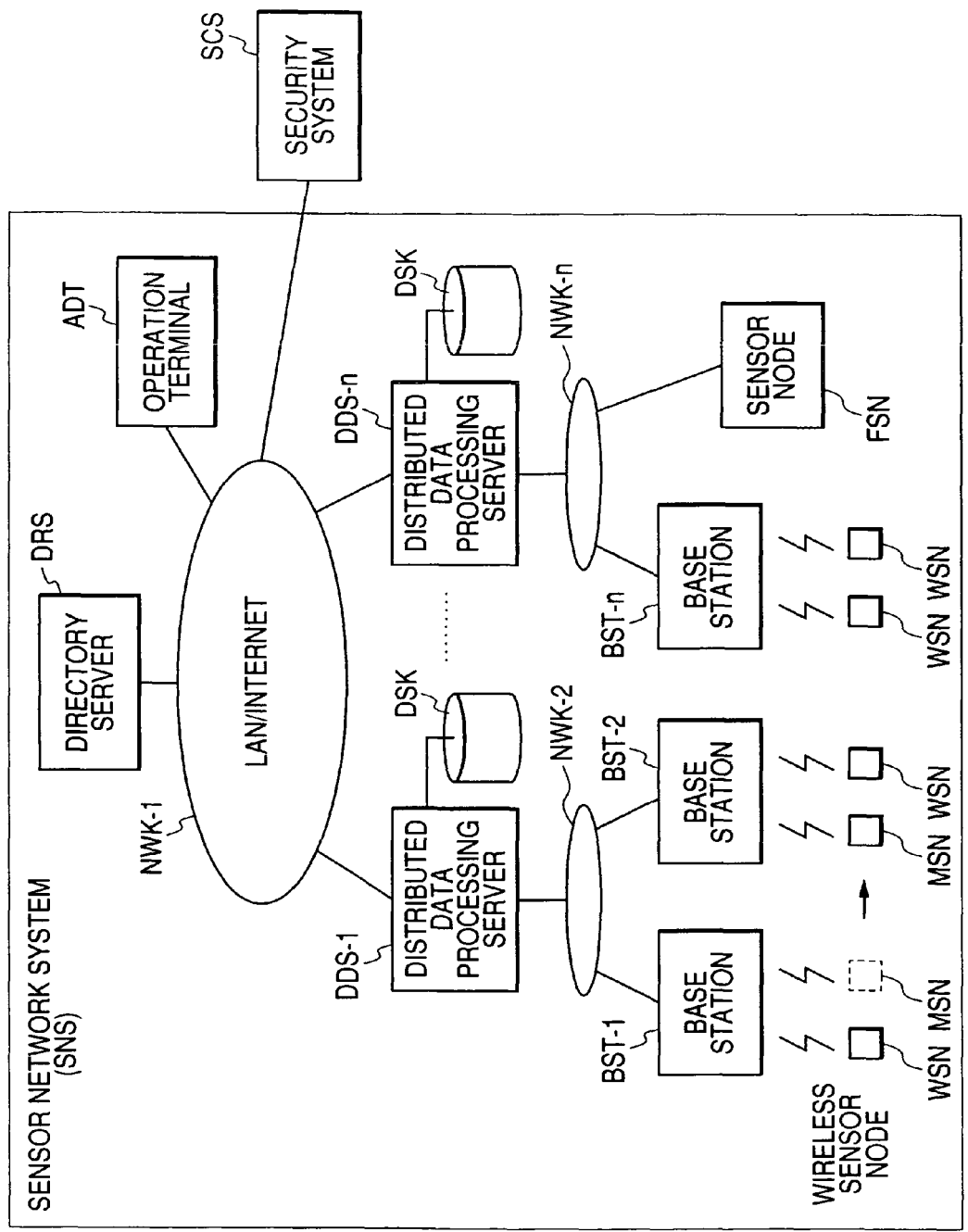
FIG. 16 is a structural diagram showing the connections between the sensor network system SNS and the security system SCS.

The embodiment of a sensor network/application link system configured for coordinated operation of the application system and sensor network system as explained above is described next. FIG. 16 is a structural diagram showing the connections when the security system SCS is connected as the application system APS to coordinate with the sensor network system SNS described in FIG. 1. In FIG. 16, the security system is connected via the network NWK-1 comprising the sensor network system. In the example in FIG. 16, one sensor network system SNS is connected to one security system, however multiple sensor network systems SNS may be connected. For example, when there are multiple locations (for example, offices, factories, etc.) subject to surveillance (monitoring) by the security system, then a sensor network system may be constructed at each location. Also, multiple security systems SCS may be connected to one sensor network system. One such case for example is when the supervisor of one location for monitoring, is enhancing security by simultaneously contracting with multiple different security services. Another example is when different subjects are simultaneously being monitored at the same surveillance location such as when the security system A is monitoring a visitor, and a security system B is monitoring employees, etc. Of course there may also be both multiple sensor network systems SNS and multiple security systems SCS, with each of them being mutually connected. The following description only describes the sensor network system as relating to the application system (security). However the sensor network system may fulfill not only functions relating to the application (security) at each site but may also be operated to perform other functions.

The applications are not only limited to security and clearly may be used for a diverse range of applications whose specific functions can be implemented by linking (coordinating) with the sensor network based on the means shown in this invention, such as controlling the flow of materials or controlling the air conditioning or lighting based on the presence of people.

(Security System)

Figure 17:
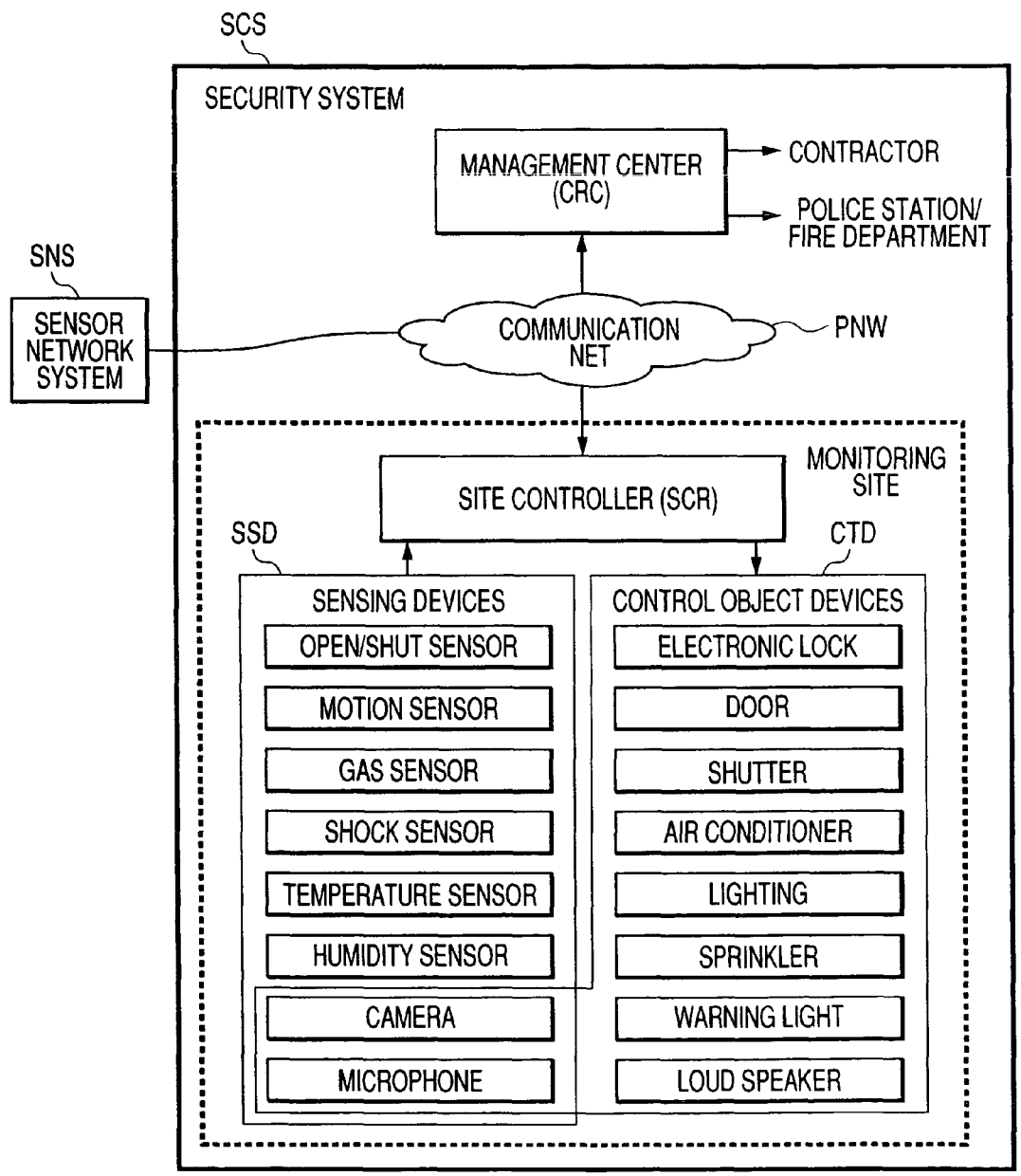
FIG. 17 is a structural diagram showing the sensor network system SNS connections with the security system SCS.

FIG. 17 is a block diagram showing the structure of a security system SCS connecting to the sensor network system SNS shown in FIG. 16. In the example in FIG. 17, the security system SCS includes a site controller SCR installed at the monitor (surveillance) site with the management center CRC, a sensing device SSD for monitoring the state at the monitor site and connected to the site controller SCR, and control object devices CTD for the monitor site controlled by the site controller SCR.

The management center CRC is a service center for integrated management of the monitor sites. The site controller SCR and the management center CRC are connected by way of a communication net PNW such as public telephone lines. The site controller SCR monitors the status of the monitor site by utilizing the sensing devices SSD, and notifies the management center CRC by the communication network PNW when an abnormality has occurred. The management center determines the type of abnormality and according to those results dispatches personnel to the monitor site, contacts the party contracting with the security service, and notifies the police or the fire department in the event of an emergency, etc. The management center also sends instructions to the site controller via the communication network PNW and controls the control object devices (CTD).

The sensing devices for example may include an open/close sensor for detecting an open or closed door, a proximity sensor for detecting the proximity or passage of a person, a gas sensor to detect gas leaks, an impact (or shock) sensor to detect impacts such as on window glass, a temperature sensor and humidity sensor for measuring the ambient temperature and humidity, a camera for image surveillance, and a microphone for acoustic surveillance, etc.

The control object devices may include for example an electronic lock for entrances and exits and machine racks, etc., doors, fire-proof/burglar proof shutters, air conditioners, lighting equipment, sprinklers for extinguishing fires in their initial stage, alarms, and speaker, etc. Sensing equipment such as cameras or microphones are also included among control object devices.

Figure 18:
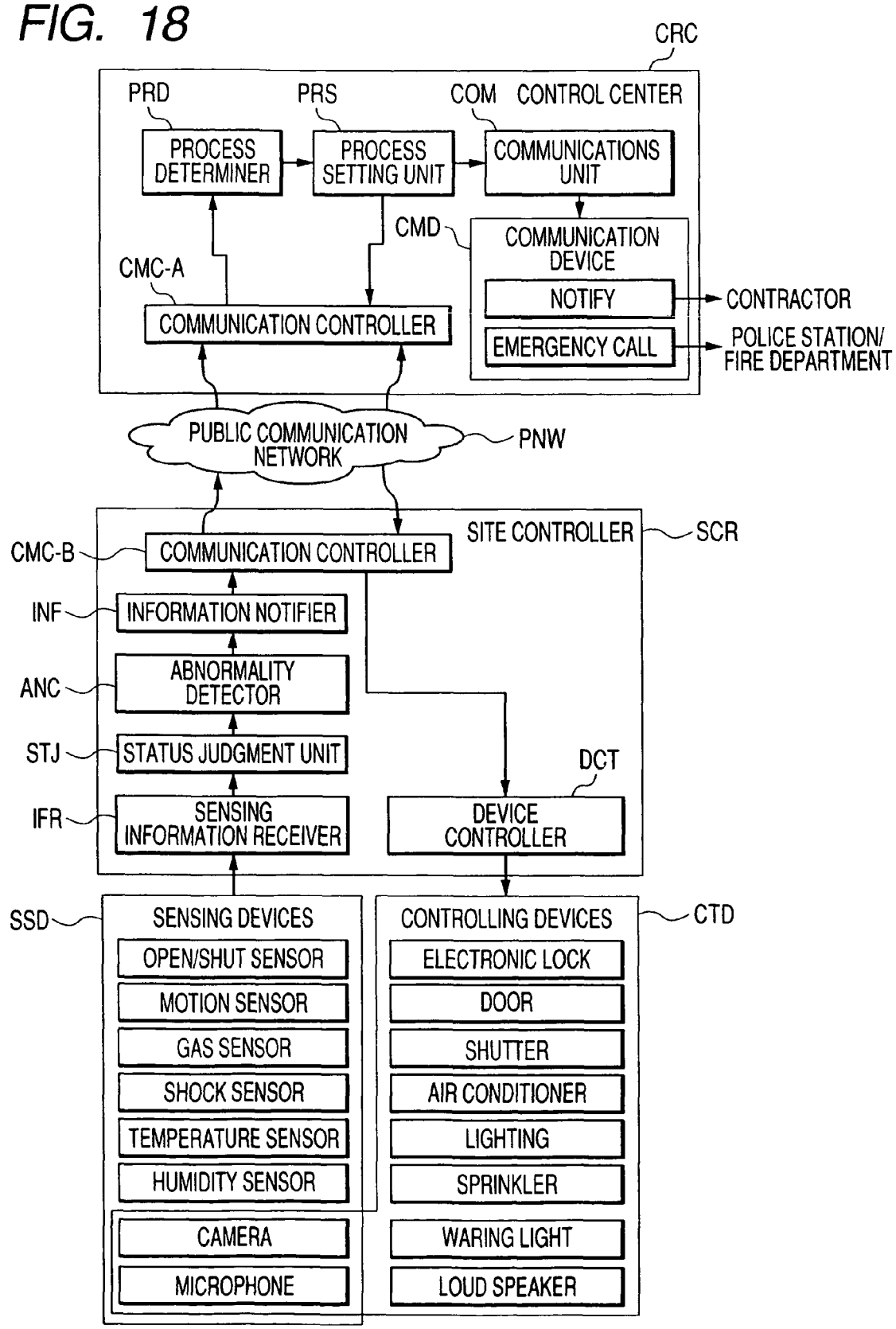
FIG. 18 is a drawing showing the processing flow in the security system.

The process flow in the security system is described next while referring to FIG. 18.

The sensing information receiver IFR in the site controller SCR acquires information from the site being monitored by using sensing devices SSD installed at the monitored site. The status judgment unit STJ decides the state of the monitored site such as gas leaks and closed or open entrances and exits using information acquired from the sensing information receiver IFR. The abnormality detector ANC decides whether the state determined by the status judgment unit STJ is abnormal or not, and if detected as abnormal, sends an abnormality signal to the information notifier INF. The information notifier INF notifies the management center CRC of the abnormality signal via the communication network PNW using the communication controller CMC-B. In the management center CRC, the abnormality signal is received utilizing the communication controller CMC-A, the processing for the abnormal signal is decided in the process determiner PRD, and the actual countermeasure processing is set by the process setting unit PRS. For example, when the countermeasure processing is contacting the contracting party or notifying the police or fire department, then the process is set in the communications unit COM, and the communications unit COM then contacts the contracting party or notifies the police or fire department by utilizing the communication device CMD. When devices are to be controlled at the monitored site as countermeasure processing, the processing instructions are sent to the site controller SCR via the communication network PWN by using the communication controller CMC-A. The site controller SCR sends the processing instructions to the device controller DCT using the communication controller CMC-B, and the device controller DCT controls one or multiple control object devices CTD.

(Coordinating the Security System and Sensor Network System)

Figure 19:
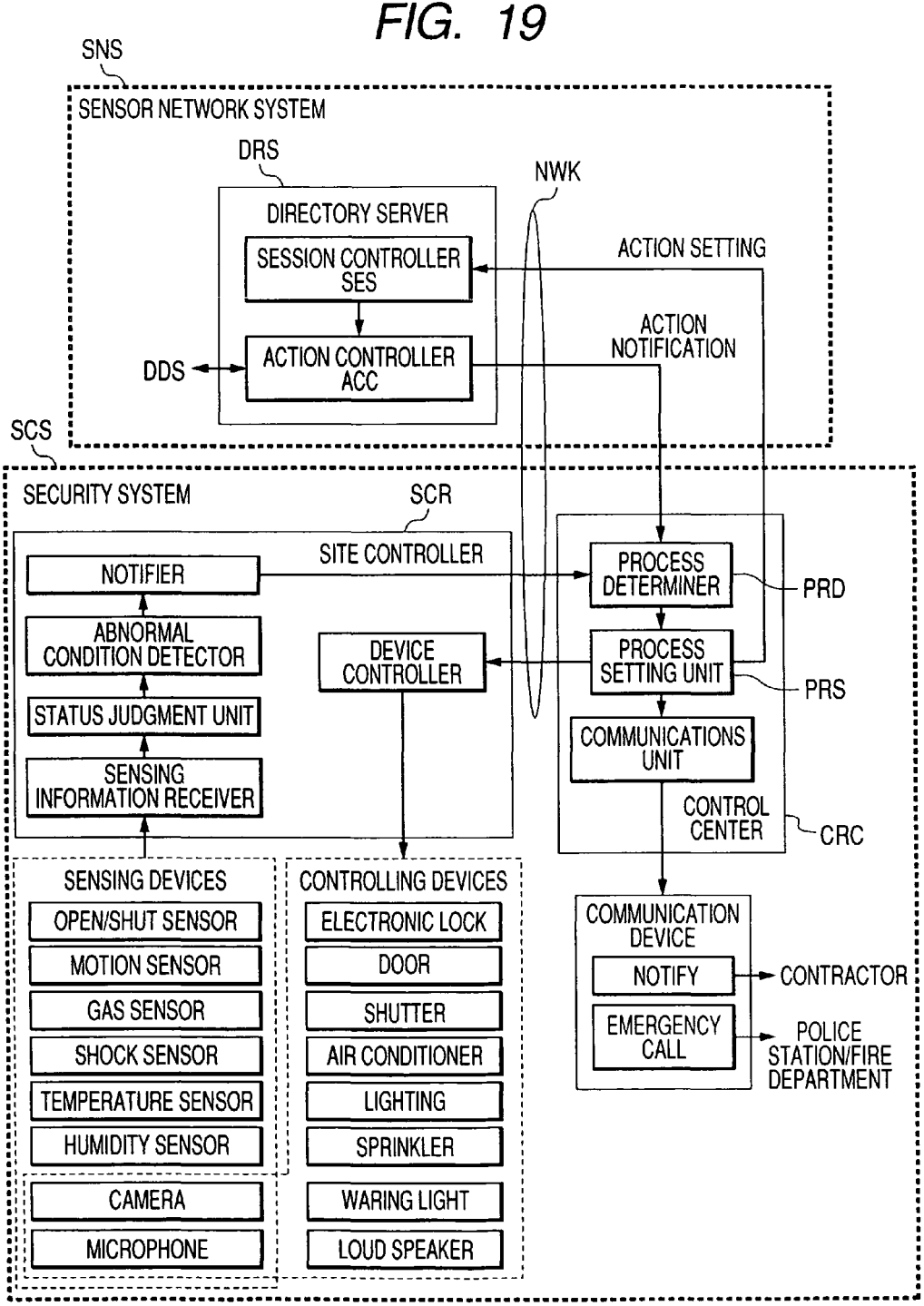
FIG. 19 is a diagram showing the case when linking the sensor network system SNS with the security system.

FIG. 19 is a block diagram showing an essential section for coordinating the security system and sensor network system. In this structure, the security system is an application system in the sensor network system. Therefore when coordinating the security system and the sensor network system, the security system sets an action in the sensor network system as described in FIG. 8 through FIG. 15 and is notified of an action when an event occurs.

In the structure of FIG. 19, the process setter PRS for the management center CRC as a structural element of the security system SCS, instructs the sensor network system SNS on event occurrence condition, and sets action notifications during an event occurrence, and makes action setting requests to the session controller SES of the directory server DRS as a structural element of the sensor network system SNS. The sensor network system SNS accepts the action setting requested by the process setter PRS in the session controller SES, and analyzes the action in the action controller ACC. The action controller ACC issues event monitoring instructions to the distributed data processing server DDS, and receives the event that occurred, executes the preset action, and as an action-notifies the process determiner PRD of the management center CRC comprising the security system SES.

The process determiner PRD determines the countermeasure processing based on the abnormality report from the site controller SCR of the security system, and the action notification, and the process setter PRS sets the countermeasure processing. Hereafter, an example of the security system SCS setting an action in the sensor network system SNS is described next.

The security system selects the action model for the person at the monitored site, and sets the action. The type and state of the abnormality is decided from the information of the sensing device connected to the security system and the action notification based on the event that occurred due to an abnormal action of the person being monitored and the security system processing is set; and countermeasure processing such as controlling the devices for control, contacting the contracting party, notifying the police and fire department, and dispatching personnel is performed.

In the sensor network system, the different types of parameter settings for the sensor network system such as sensing periods (intervals) or sensor node communication periods (intervals) are adjusted, and change requests are sent to the device manager NMG of the sensor network system.

In the countermeasure processing for the security system, the target area for example is divided into multiple monitor areas, security action ranks are established for each area, and the process determiner PRD specifies the monitor area and changes the security action rank of the specified monitor area.

An example of the security action ranks is shown in FIG. 20. The security action rank is utilized by the security system SCS. Items such as the countermeasure, control device for the countermeasure process, notification, personnel items are specified regardless of the sensor network. Here, a special feature is that the security action rank is changed by utilizing information from the sensor network. For example, the information "Duration of unexpected action exceeds specified value" can be registered as an event the network must detect, and when a matching event is detected, an action is implemented where the sensor network notifies the security system of that event. The security system receiving the notification from the sensor network, executes a countermeasure (abnormal level 2 in the above contents) in response to that security level. A unique action of the sensor network itself may also be executed. For example, the rate of communication with the sensor nodes may be increased or the alarm in the sensor node may be activated as in the example of FIG. 20. This type of structure allows establishing a detailed security environment without applying excessive pressure on the person who is the subject of the surveillance.

The example of sensors connected to a security system was utilized here to describe sensing devices utilized for monitoring the state at the monitor site. However, sensors may be installed as needed in the sensor nodes connected to the sensor network system for security monitoring purposes, and the state of the monitor site may be monitored while under the control of the sensor network system.

The controlled devices may be connected to the sensor network system, and the control of the control devices may be performed via the sensor network system. In this case, the security system is one structure along with the sensor network system. The acquisition of sensor information, and control of controlled devices may all be performed utilizing the event action functions of the sensor network system.

In this type of structure, when installing a new security system such as in an office building where the sensor network system is used, the security system does not need an infrastructure to newly connect sensing devices and controlled devices so the effect is obtained that installation costs are kept to a low figure.

Figure 21:
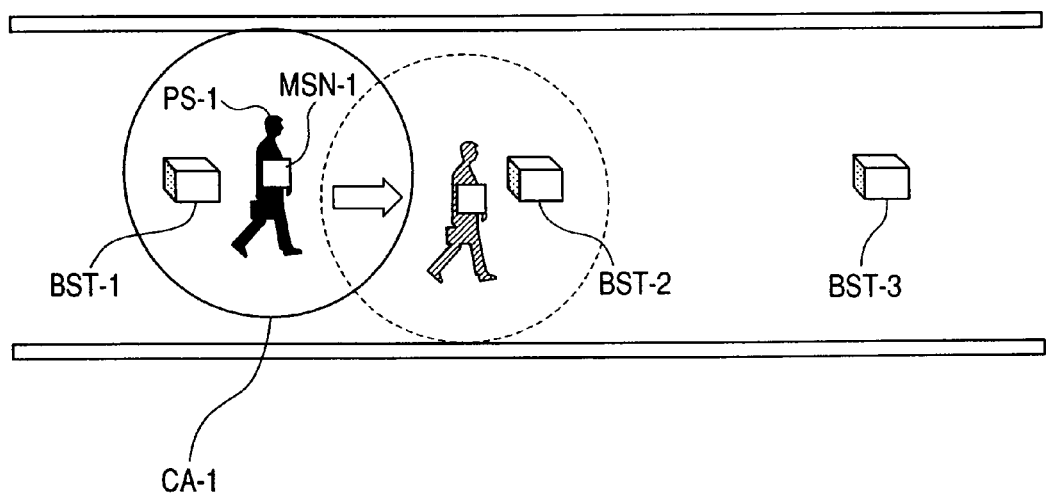
FIG. 21 is a drawing showing the method for identifying the action of the subject under surveillance.

FIG. 21 is a drawing showing the method for determining the action of surveillance subject when for example performing surveillance in an office building that is the site monitored by the security system.

The figure shows the corridor of an office building. The base stations BST-1, BST-2, BST-3 of the sensor network system are for example installed at intervals allowing sufficient communication with sensor nodes in the ceiling of the office building.

The surveillance subject PS-1 entering the office building receives a name tag type mobile sensor node MSN-1 showing information for designating an individual from the receptionist, and this (MSN-1) is attached for example to the chest of PS-1. The receptionist at this time registers the node ID of MSN-1 using the node registration function of the sensor network system, and links it to personal information of surveillance subject PS-1. An example of a personal information table is shown in FIG. 22. In the example in FIG. 22, information is registered in the table contents assuming that a visitor is to be monitored. The contents that should be registered in the personal information table may be set as needed according to the objective and the site policy. There should at least be a link between the individual and the attached sensor ID.

In FIG. 21, a three second period for a wireless transmission from the node ID is for example set from the period that registering the sensor node MSN-1 is completed. The MSN-1 wireless arrival area is set as CA-1.

When the surveillance subject PS-1 with the MSN-1 attached proceeds along the corridor of the office building, information such on the node ID sent by MSN-1, is received by the base station BST-1 within the wireless arrival area CA-1, so that the surveillance subject PS-1 can be identified as in the vicinity of the base station BS-1 located in the wireless arrival area of MSN-1. The subject PS-1 then moves again and if the base station BST-2 receives the node ID for MSN-1, then the subject PS-1 is known to have arrived in the vicinity of BST-2. If the locations where the base stations are installed are registered in advance, then by utilizing a history of base station positions where the node ID was detected, then what route of the surveillance area that the surveillance subject PS-1 is taking, and where PS-1 currently is located can be detected by the accuracy of the wireless arrival area size. The approximate moving speed of the surveillance subject PS-1 can also be estimated at this time by calculating the difference in the times that each base station received the node. If the base stations are installed densely enough, then the node MSN-1 transmission can always be received by one of the base stations provided there are no factors such as communication errors. Therefore, a state where a transmission from the node is not received from any of the base stations within a fixed time can be set as an event, so that if transmission was stopped by the surveillance subject PS-1 for example turning off the node MSN-1 switch or destroying the MSN-1 then the action of notifying the security system of that abnormal state is executed.

If an event is set to occur when a pre-established value is exceeded within the movement time between base stations, within the area where the subject is essentially supposed to move within a fixed time as determined from the personal information, then it can be assumed that the surveillance subject PS-1 has taken an unexpected action such as becoming lost or has stopped, etc.

Figure 23:
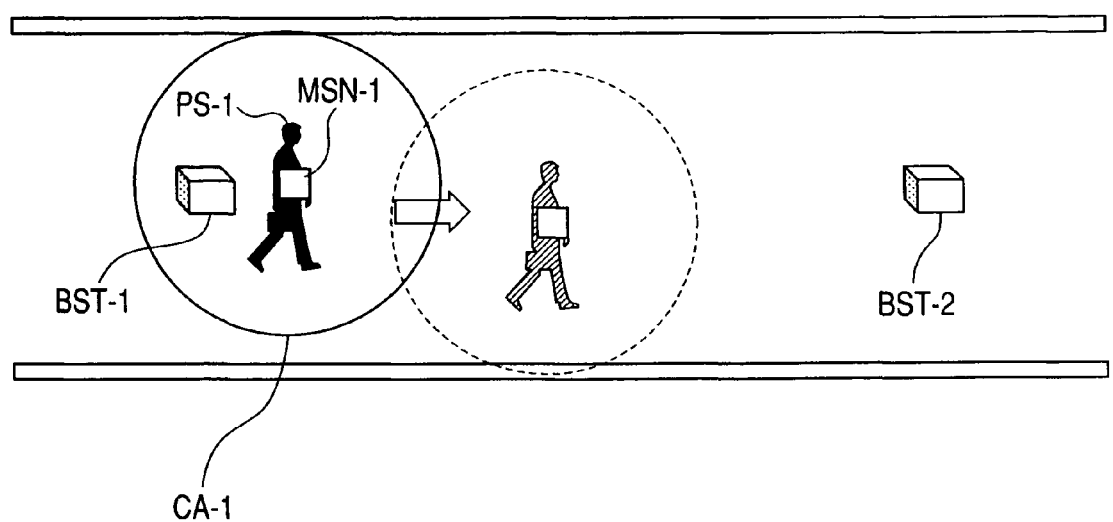
FIG. 23 is an example of the method for identifying the action of the subject under surveillance when there is a wide interval between the base station BST installations.

FIG. 23 is an example of the case where there is a wide distance between base stations BST. In this case, the base station BST-1 is within the range of the wireless arrival area CA-1 of the node MSN-1 attached to the surveillance subject PS-1, and there is communication between the MSN-1 node and the BST-1. The surveillance subject PS-1 then moves and in some cases there are no base stations present within the range of any of the wireless arrival area CA-1, during the period before the MSN-1 node enters within the wireless arrival area CA-1 range of the next base station BS-2. In this state, a signal sent from the sensor node MSN-1 is not received by any of the base stations so that location of the surveillance subject PS-1 is unknown. In this kind of state, the action can be predicted from the movement speed and movement direction of the surveillance subject PS-1, and the time range that the MSN-1 enters the wireless arrival area CA-1 range of BST-2, and an event occurrence condition can be established to determine that the range of the action is normal if a transmission from MSN-1 is received by the base station BST-2 within that time range. In this way, an action can be executed notifying the security system of an abnormal action when the base station receives the next transmission from the node or if the surveillance subject did not arrive in the vicinity of the range assumed for the base station within the estimated time range.

A method for measuring the state of the surveillance subject PS-1 even more accurately is to install sensors such as an acceleration sensor or vibration sensor, bearing (directional) sensor, gyro sensor in the mobile sensor node MSN. The acceleration sensor and vibration sensor measure the movement of the body on which the sensors are attached, so that the stance and walking behavior of the subject can be determined. Also, the displacement and what direction the body of the surveillance subject is facing can be determined from the bearing sensor and the gyro sensor. If the movement speed and direction of the surveillance subject is determined from using a combination of these sensors, then the action of that surveillance subject can be estimated.

If the surveillance subject has intentionally removed the name tag node or the node has dropped off, then this can be detected by a change in acceleration detected by the acceleration sensor or by installing a mount/release switch on the clip section of the name tag node for detecting the on/off state by detecting if the clip is opened or closed.

Figure 24:
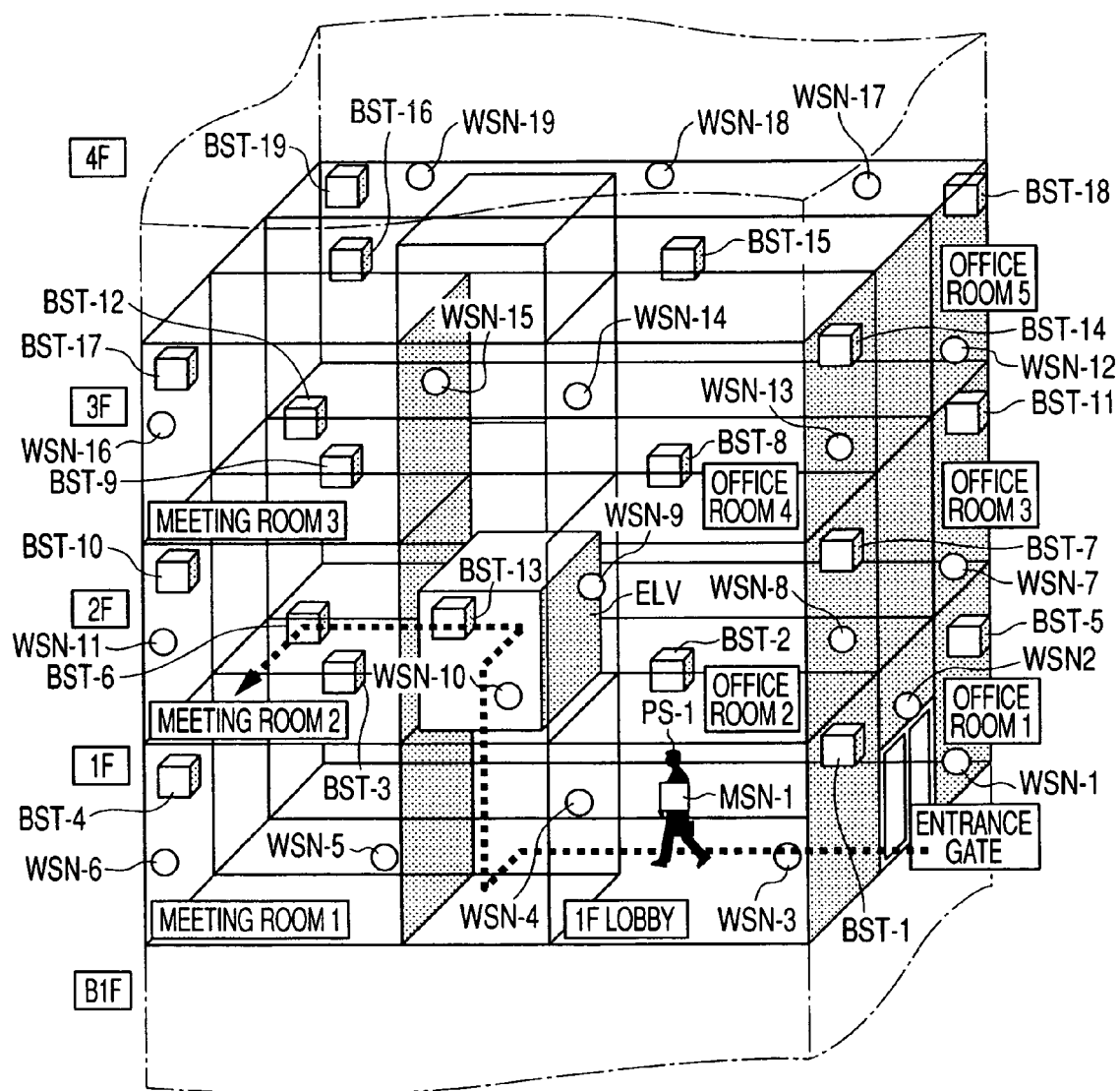
FIG. 24 is an example of tracking the action of a person that visited an office building.

FIG. 24 is an example tracing the action of a person visiting the office building. The visitor PS-1 currently visiting this office building is Mr. Taro Suzuki from the list in FIG. 22. This visitor PS-1 first passes through the entrance and conveys personal information such as his full name, purpose of visit, and destination to the front receptionist. The receptionist links the ID for the name tag sensor node MSN-1 with the personal information of the visitor PS-1, and after attaching it (node) to the chest of visitor PS-1, activates it by turning the power switch on. In this state, the visitor PS-1 is registered in the system as a surveillance subject. The surveillance subject PS-1 heads towards the meeting room 2 which Is the destination. The action model for the person PS within the office building is specified in the bind list as shown in FIG. 25. The actions of the surveillance subject PS-1 are specified based on the personal information list in FIG. 22, and the action model of FIG. 25. Here, the surveillance subject PS-1 is the customer, and the purpose of the visit is a conference, and the normal route from the front reception to the second meeting room is in the sequence of: the first floor lobby to the central elevator, to the second floor lobby, to the second corridor, to the second meeting room so that the estimated required time is five minutes. The actions of the surveillance subject PS-1 are monitored based on this model using the method shown in FIG. 21. A deviation from the estimated behavior is registered as an event in the security system, and an action set to notify (the security system of) the event occurrence as an action. In the example in FIG. 25, there is a second floor corridor (hallway) entrance, and a passage gate at the second floor meeting room entrance on the route from the entrance room to the second floor meeting room. Passage through the gate is monitored by a proximity sensor for the gate monitor connected to the security system. The security system links the action of the surveillance subject PS-1 monitored by the sensor network system, with the gate passage timing information, and based on time correlations detects an abnormal action, and decides to execute security countermeasures.

The following conditions are set for example as event deviations from the assumed actions.

Exceeding the specified required time (might possibly have visited somewhere else)

Time was shorter than the specified required time (might have run)

Did not arrive within estimated time range (period from T1 to T2, T2>T1) in area on specified route (did not take estimated route)

Did not pass through passage gate on specified movement path within specified time range (period from T3 to T4, T4>T3) (did not take estimated route)

Arrived in area outside the specified movement path

Approached a restricted entry area

The security system starts a specified action when an abnormal action such as described above was detected by the sensor net. For example if the specified required time was exceeded then countermeasures taken might include raising the security level one stage in adjacent areas.

During the setting of event occurrence conditions, the sensing information management function of the sensor network system can be utilized to add condition decision criteria such as an event occurrence history during the previous visit, or disparities with information on the actions of companions, moreover event occurrence histories from visits to a separate site monitored by the sensor network system may also be added.

The examples utilized action histories of persons to determine or predict abnormalities, however acceleration sensors and other sensors of different types may also be utilized.

APPLICATIONS IN INDUSTRY

The security system of this invention as described above is capable of managing the action history of people so that a security service can be provided that is able to monitor the area for surveillance in fine detail, and quickly take countermeasures. Moreover, a surveillance system can be achieved that applies little stress to the subject being monitored.

What is claimed is:

1. A security system including:
a device installed at a site,
a control device for controlling a state of the device, and
a management device for specifying the device to control a state according to any one of a plurality of preset security levels,
wherein the management device can connect to a first server via a network,
the first server contains a function for detecting whether information collected from multiple nodes installed within a site matches conditions registered beforehand, and
the management device registers conditions beforehand in the first server when there is a change in the security level, and receives notification from the first server that there is a match to the conditions, so that changes in the security level can be made to match the conditions.

2. A security system according to claim 1, including:
a first server connected via a network to a second server,
a second server for storing information collected from multiple nodes,
wherein the first server is capable of accessing information stored in the second server by storing storage destination information showing the storage destination of the information, and the first server or the second server detects matching conditions.

3. A security system according to claim 1, wherein the state of multiple nodes installed within a site are identified according to the security level, and when the first server detects a matching condition, the multiple nodes are controlled so that the security level is changed according to the corresponding condition.

4. A security system according to claim 1, wherein the multiple nodes include node attachable to a person, and the condition is that changes over time in the actions of a person collected from the attachable nodes, are excluded from the range allowed in the pre-registered personal information.

5. A security system according to claim 1, further including a sensing device within the site, and the control device identifies an error based on information from the sensing device.

6. A security system according to claim 5, wherein the first server collects information from the sensing device for use in judging the registered conditions.

7. A security system according to claim 1, including a surveillance camera as the sensing device, wherein the method for controlling the surveillance camera is changed according to the security level.

8. A method for managing a site, comprising:
controlling states of devices installed in the site to a state according to any one of a plurality of preset security levels,
setting conditions beforehand in a first server for changing a security level,
receiving notification from the first server that information collected from multiple nodes installed in the site matches preset conditions, and
controlling the state of one of the devices so that changes in the security level are made according to the matched preset conditions.

9. A method for managing a site according to claim 8, wherein a second server collects information from multiple nodes, and the first server or the second server detects a match with the preset conditions.

10. A method for managing a site according to claim 8, wherein states of the multiple nodes installed in the site are identified according to the security level, and the multiple nodes are controlled so that changes in the security level are made according to the matched preset conditions.

* * * * *